(12) United States Patent
Li et al.

(10) Patent No.: US 8,908,753 B2
(45) Date of Patent: Dec. 9, 2014

(54) CALIBRATION SUB-SYSTEM FOR TELECOMMUNICATION SYSTEMS

(71) Applicant: Andrew LLC, Hickory, NC (US)

(72) Inventors: Zhao Li, Forest, VA (US); Neil Townsend Hobbs, Forest, VA (US)

(73) Assignee: Andrew LLC, Hickory, NC (US)

( * ) Notice: Subject to any disclaimer, the term of this patent is extended or adjusted under 35 U.S.C. 154(b) by 60 days.

(21) Appl. No.: 13/896,634

(22) Filed: May 17, 2013

(65) Prior Publication Data

US 2013/0308693 A1    Nov. 21, 2013

Related U.S. Application Data

(60) Provisional application No. 61/648,241, filed on May 17, 2012.

(51) Int. Cl.
| | |
|---|---|
| *H04B 3/46* | (2006.01) |
| *H04W 24/02* | (2009.01) |
| *H04B 17/00* | (2006.01) |
| *H04B 7/02* | (2006.01) |

(52) U.S. Cl.
CPC ........... *H04W 24/02* (2013.01); *H04B 17/0062* (2013.01); *H04B 7/022* (2013.01)
USPC ....................................................... 375/224

(58) Field of Classification Search
USPC ................. 375/224, 227, 285, 316, 322, 340; 455/67.11, 67.14
See application file for complete search history.

(56) References Cited

U.S. PATENT DOCUMENTS

| | | | |
|---|---|---|---|
| 6,745,003 B1 | 6/2004 | Maca et al. | |
| 6,747,595 B2 * | 6/2004 | Hirabe | 342/174 |
| 6,934,541 B2 * | 8/2005 | Miyatani | 455/423 |
| 7,068,218 B2 * | 6/2006 | Gottl et al. | 342/368 |
| 7,139,536 B2 | 11/2006 | Chiu | |
| 7,206,557 B2 | 4/2007 | Aytur et al. | |
| 7,292,182 B2 * | 11/2007 | Quievy | 342/174 |
| 7,298,793 B2 | 11/2007 | Wu et al. | |
| 7,657,236 B2 | 2/2010 | Pan | |
| 7,941,106 B2 | 5/2011 | Cloutier et al. | |
| 2006/0234694 A1 * | 10/2006 | Kawasaki et al. | 455/423 |
| 2006/0238413 A1 * | 10/2006 | Yehudaie | 342/174 |
| 2008/0310529 A1 * | 12/2008 | Futatsugi | 375/260 |

* cited by examiner

*Primary Examiner* — Khanh C Tran
(74) *Attorney, Agent, or Firm* — Kilpatrick Townsend & Stockton LLP

(57) ABSTRACT

A calibration sub-system for calibrating a unit of a distributed antenna system is provided. The calibration sub-system includes a signal generator, a receiver, and a processor. The signal generator provides test signals to a communication path that are generated based on modification schemes for an in-phase signal component ("I component") or a quadrature signal component ("Q component"). The receiver receives output signals generated from test signals. The processor determines output power values for an undesirable signal component of the output signals. Each output power value is a Taylor series function or a polynomial function of a respective modification scheme for the I or Q component of the respective test signal. The processor determines an optimal modification scheme for the I or Q component that minimizes an output power of the undesirable signal component. An output value of the function is minimized by having the optimal modification scheme as an input.

20 Claims, 18 Drawing Sheets

| Frequency (MHz) | Local Oscillator Leakage Power(dBc) | Sideband Image Power(dBc) |
|---|---|---|
| 1000 | <-60 | -60 |
| 1005 | <-60 | -60 |
| 1010 | <-60 | -60 |
| 1015 | <-60 | -60 |
| 1020 | -58 | -60 |
| 1025 | -55 | -60 |
| 1030 | -53 | -60 |
| 1035 | -50 | -60 |
| 1040 | -49 | -60 |
| 1045 | -47 | -60 |
| 1050 | -45 | -60 |

FIG. 14

| White Noise Power (dBc) | Local Oscillaor Leakage Power(dBc) | Sideband Image Power(dBc) |
|---|---|---|
| 0 | -32 | -20 |
| -10 | -39 | -40 |
| -20 | -50 | -48 |
| -30 | -60 | -58 |
| -40 | -60 | -60 |

FIG. 15

| Uplink Local Oscillator Freq(MHz) | Downlink Local Oscillator Freq(MHz) | Local Oscillator Leakage Power (dBc) | Sideband Image Power (dBc) |
|---:|---:|---:|---:|
| 381 | 730 | -59 | -50 |
| 401 | 750 | -58 | -54 |
| 501 | 850 | -61 | -55 |
| 601 | 950 | -60 | -60 |
| 701 | 1050 | -60 | -60 |
| 801 | 1150 | -58 | -60 |
| 901 | 1250 | -60 | -60 |
| 1001 | 1350 | -57 | -60 |
| 1101 | 1450 | -60 | -60 |
| 1201 | 1550 | -58 | -60 |
| 1301 | 1650 | -60 | -57 |
| 1401 | 1750 | -58 | -60 |
| 1501 | 1850 | -60 | -60 |
| 1601 | 1950 | -60 | -60 |
| 1701 | 2050 | -60 | -60 |
| 1801 | 2150 | -58 | -60 |
| 1901 | 2250 | -59 | -60 |
| 2001 | 2350 | -59 | -59 |
| 2101 | 2450 | -59 | -56 |
| 2201 | 2550 | -60 | -57 |
| 2301 | 2650 | -60 | -59 |
| 2401 | 2750 | -59 | -60 |
| 2501 | 2850 | -57 | -60 |
| 2601 | 2950 | -57 | -60 |
| 2701 | 3050 | -58 | -60 |

FIG. 19

US 8,908,753 B2

CALIBRATION SUB-SYSTEM FOR TELECOMMUNICATION SYSTEMS

CROSS-REFERENCE TO RELATED APPLICATION

This application claims priority to U.S. Provisional Application Ser. No. 61/648,241 filed May 17, 2012 and titled "Calibration Sub-System for Telecommunication systems," the contents of which are hereby incorporated by reference.

COPYRIGHT NOTIFICATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to telecommunication systems and more particularly relates to reducing local oscillator leakage power and sideband image power in telecommunication systems.

BACKGROUND

Units of a telecommunication system, such as a master unit in a distributed antenna system ("DAS"), may include interface cards for communicating signals between units of the DAS and base stations and/or repeaters in communication with the DAS. Interface cards of a master unit may include direct conversion transmitter or other suitable transmitting devices for transmitting uplink signals from a master unit to a base station or repeater. Direct conversion transmitters can generate uplink signals with a carrier signal component at a center frequency and signal components at frequencies above and below the carrier frequency, such as sideband signal components, that can be modulated to communicate information via the uplink signal. Direct conversion transmission may involve information being communicated by modulating the sideband signal components having relatively higher power than the carrier signal.

Direct conversion transmitters can include local oscillators, mixers, summers, and amplifiers. The local oscillators can generate radio frequency ("RF") signals at an output frequency for a transmitter of the unit. The RF signals from local oscillators can be combined with modulating signals having information to be transmitted via mixers to create a modulated RF signal. Amplifiers can increase the amplitude or strength of signals. Low frequency amplifiers may be used to amplify the modulating signals. High frequency RF amplifiers may be used to amplify modulated radio signals. Summing circuits may add or otherwise combine two signals to generate a sum signal.

One disadvantage of using direct conversion transmitters is the generation of undesirable signal components such as local oscillator leakage signals. A local oscillator leakage signal can be a signal transmitted by a direct conversion transmitter at a carrier frequency. The signals provided by local oscillators of a direct conversion transmitter may have a frequency at or near the carrier frequency. Normal operation of a direct conversion transmitter may include minimizing the power of the signal components provided by local oscillators such that sideband signal components having data to be transmitted have more power than the local oscillators. However, errors in local oscillator circuits may cause the transmitter to emit power at or near the carrier frequency. The undesired signal component transmitted at the carrier frequency is a local oscillator leakage signal that can reduce the performance of the transmitter.

Another disadvantage of using direct conversion transmitters is the generation of undesirable sideband image signals. Sideband image signals can be caused by gain imbalance and errors in a quadrature-mixing phase difference between an in-phase ("I") component and a quadrature ("Q") component of a complex uplink signal. A gain imbalance can be caused by an uplink signal having an I component and a Q component with different signal powers. A quadrature-mixing phase difference error can be caused by oscillators of an I/Q modulator or demodulator using signals that do not differ by exactly ninety degrees. Both gain imbalance and quadrature-mixing phase errors can generate sideband images of sideband signal components. I/Q gain imbalance and I/Q phase difference errors in quadrature mixing can cause the power of sideband image signal components to exceed a spectral mask for a telecommunication system.

It is desirable to reduce local oscillator leakage power and sideband image power in telecommunication systems.

SUMMARY

Certain aspects and features of the present invention are directed to calibrating a unit of a distributed antenna system ("DAS").

In one aspect, a calibration sub-system is provided for calibrating a unit of a DAS. The calibration sub-system includes a signal generator communicatively coupled to a communication path of the unit, a receiver in the communication path, and a processor communicatively coupled to the signal generator and the receiver. The signal generator provides test signals to the communication path that are generated based on modification schemes for an in-phase signal component ("I component") or a quadrature signal component ("Q component"). The receiver receives output signals generated from test signals. The processor determines output power values for an undesirable signal component of the output signals. Each output power value is function (such as a Taylor series function or a polynomial function) of a respective modification scheme for the I or Q component of the respective test signal. The processor determines an optimal modification scheme for the I or Q component. An optimal modification scheme minimizes an output power of the undesirable signal component. An output value of the function is minimized by having the optimal modification scheme as an input.

In another aspect, a method is provided for calibrating a unit of a DAS. The method involves selecting an I component or a Q component affecting an output power of an undesirable output signal component. The method also involves selecting modification schemes for the I component or the Q component. The method also involves providing test signals respectively generated based on the modification schemes to a communication path of the unit. The method also involves determining output powers for output signal generated using the test signals. Each output power value is function (such as a Taylor series function or a polynomial function) of a respective modification scheme for the I or Q component of the respective test signal. The method also involves an optimal modification scheme for the I or Q component. An optimal modification scheme minimizes an output power of the undesirable signal component. An output value of the function is minimized by having the optimal modification scheme as an input.

BRIEF DESCRIPTION OF THE DRAWINGS

FIG. 14 is a chart depicting example values for local oscillator leakage power and sideband image power for a remote antenna unit calibrated using a calibration sub-system according to one aspect.

FIG. 15 is a chart depicting example values for local oscillator leakage power and sideband image power for a remote antenna unit calibrated using a calibration sub-system according to one aspect.

FIG. 19 is a chart depicting example values for local oscillator leakage power and sideband image power for a telecommunication system calibrated using a calibration sub-system according to one aspect.

DETAILED DESCRIPTION

Figure 1:
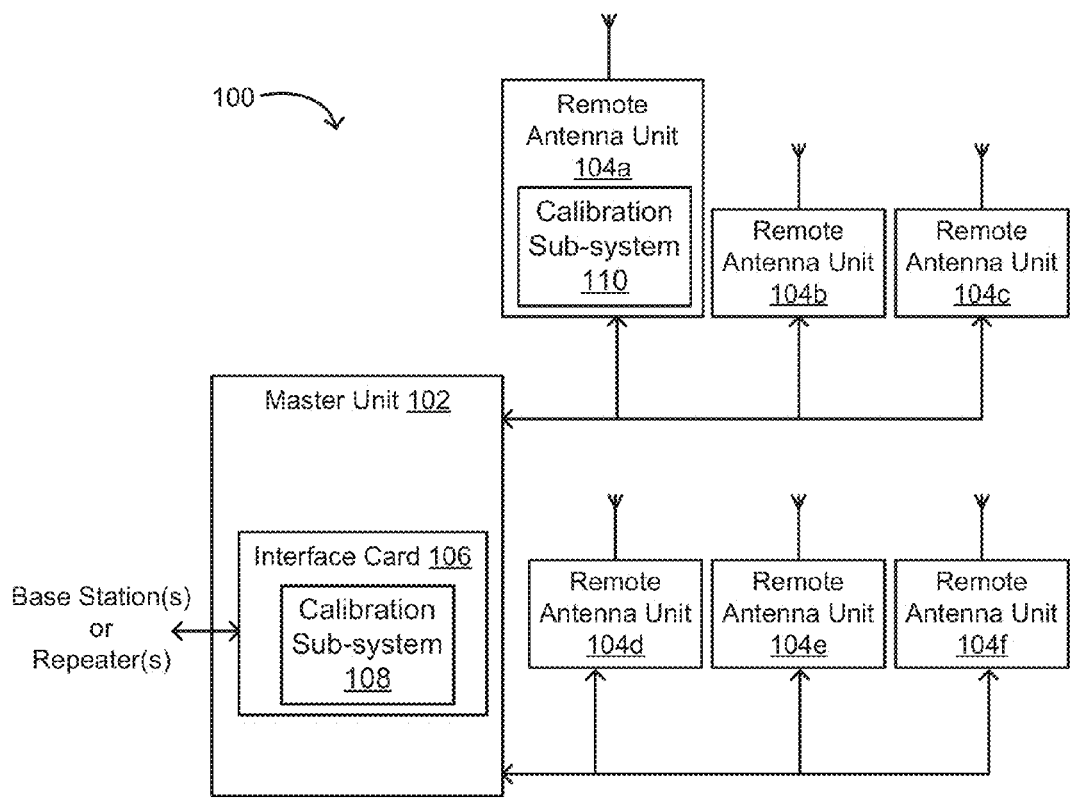
FIG. 1 is a block diagram of a distributed antenna system in which one or more components having a calibration sub-system can be disposed according to one aspect.

Certain aspects and examples are directed to a calibration sub-system that can be integrated into one or more units of a telecommunication system, such as a distributed antenna system ("DAS"). Non-limiting examples of units in a DAS include a master unit and a remote antenna unit. A calibration sub-system can select parameters for complex signals communicated via a DAS or other telecommunication system such that the signal powers of undesirable signals, such as local oscillator leakage signals or sideband image signals, are minimized.

In some aspects, a calibration sub-system includes a signal generator, a receiver positioned in a communication path of the unit, and a processor in communication with the signal generator and the receiver. The signal generator provides test signals to the communication path that are generated based on modification schemes for an in-phase signal component ("I component") or a quadrature signal component ("Q component"). The receiver receives output signals generated from test signals. The processor determines output power values for an undesirable signal component of the output signals. Undesirable signal components can include sideband image signal component and local oscillator leakage signal components. Each output power value is a Taylor series function or a polynomial function of a respective modification scheme for the I or Q component of the respective test signal. The processor determines an optimal modification scheme for the I or Q component that minimizes an output power of the undesirable signal component. An output value of the function is minimized by having the optimal modification scheme as an input.

The calibration sub-system can calibrate a unit of DAS using a calibration process or other suitable process. A calibration process or other suitable process can involve the signal generator of the calibration sub-system generating test signals. The test signals can be complex signals having I and Q components. The processor can control or configure the signal generator to generate the test signals based on modification schemes. A modification scheme can include using one or more testing values for one or more parameters of I and/or Q components of the test signals. Examples of the I component parameters and the Q component parameters can include (but are not limited to) the respective offsets of the I and/or the Q components, the respective gains of the I and/or the Q components, the quadrature-mixing phase difference between the I and Q components, and the differential delay between the I and Q components. The parameters for the I and Q components can control or otherwise affect a digital-to-analog conversion process executed by a digital-to-analog converter of a transmitter of the DAS unit.

The receiver can receive output signals generated using the test signals via the communication path. The output signals can be signals traversing a communication path of a unit that are generated from signals transmitted by a transmitter disposed in another communication path and recovered by a receiver disposed in the communication path to which the test signals are provided. The output power for each output signal can be a function of one or more parameters of the I and/or Q component of a respective test signal from which the output signal is generated. The local oscillator leakage power of an output signal can be a function (such as, but not limited to, a two-dimensional Taylor series or a polynomial function) of the respective offsets of the I and Q components. The sideband image power of an output signal can be a function (such as, but not limited to, a three-dimensional Taylor series or polynomial function) of the respective gains of the I and Q components and the quadrature-mixing phase between the I and Q components.

The processor can determine an optimal modification scheme for one or more I and/or Q component parameters based on a function relating the output power values to respective testing values for the I and/or Q component parameters. The optimal modification scheme can include optimal values for one or more of the I and/or Q component parameters. The optimal values can be values for a respective I or Q parameter resulting in a minimal output power. The respective optimal value can be calculated by determining the function, such as a polynomial function, corresponding to the output powers and determining the respective values for the I parameter and/or Q parameter for a test signal that result in the minimum value of the polynomial function. The minimum value of the function can represent the minimum output power associated with an optimal I parameter and/or Q parameter.

In some aspects, the calibration sub-system can perform multiple iterations of the calibration process described above. An initial iteration can use an arbitrarily selected range of test values for I or Q component parameters. Additional iterations can use a range of test values for the I or Q component parameters grouped more closely with the optimal values for I or Q component parameters determined in an initial iteration. Performing multiple iterations can increase the accuracy of the determination of the optimal value for an I or Q parameter.

In additional or alternative aspects, one or more units of a DAS can be further optimized by optimizing a differential delay value between the I and Q parameter. A differential delay can be provided by delaying an I component with respect to a Q component and/or by delaying a Q component with respect to an I component. A given differential delay value can cause a corresponding differential phase. A differential phase can include a difference in the optimum phase for a first test signal having a frequency in a first portion of the frequency band of interest (e.g., at or near the minimum frequency of the frequency band) and a second test signal having a frequency in a second portion of the frequency band of interest (e.g., at or near the maximum frequency of the frequency band). Optimizing the differential delay between the I and Q components can allow the calibration sub-system to determine an optimum quadrature-mixing phase difference for which the differential phase is minimized across the frequency band of interest.

Detailed descriptions of certain aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative embodiments but, like the illustrative embodiments, should not be used to limit the present invention.

FIG. 1 depicts a DAS 100 having a master unit 102 in communication with the remote antenna units 104a-f and with base stations and/or repeaters and having a calibration sub-system 108. The DAS 100 can be positioned in an area, such as a stadium or office building, to extend wireless communication coverage of the base stations and/or repeaters. Different base stations and/or repeaters can be associated with different sectors of one telecommunication system operator and/or be associated with different telecommunication system operators.

The DAS 100 or other telecommunication system can include a downlink path for transporting downlink signals from one or more of the base stations or repeaters to one or more of the remote antenna units 104a-f. In the downlink direction, the DAS 100 can receive signals from the base stations and/or repeaters via a wired or wireless communication medium. Downlink signals can include signals provided from the base stations and/or repeaters and radiated by the remote antenna units 104a-f. A non-limiting example of one or more of the remote antenna units 104a-f is a universal access point.

The DAS 100 or other telecommunication system can also include an uplink path for transporting uplink signals from one or more of the remote antenna units 104a-f to one of more of the base stations or repeaters. Uplink signals are signals at frequencies in an uplink frequency band that are recovered or otherwise received by a one or more of the remote antenna units 104a-f from wireless devices in a coverage area serviced by the DAS 100.

The master unit 102 can communicate signals between the base stations and/or repeaters and the remote antenna units 104a-f. An example of a master unit is a wireless conversion station. The master unit 102 can include one or more devices for processing the signals communicated between the base stations and/or repeaters and the remote antenna units 104a-f. Processing the signals can include transforming the signals received from the base stations and/or repeaters into a digital format. Processing the signals can also include filtering downlink signals from the base stations and/or repeaters. The master unit 102 can also include one or more devices for routing signals from the base stations and/or repeaters to the remote antenna units 104a-f. Routing the signals can include combining the signals of the sectors from one or more base stations and/or repeaters. Routing the signals can also include transforming the signals into a format used by the remote antennas and providing the combined signals to the remote antennas.

An example of a device in a master unit 102 for used for processing and routing signals is an interface card 106. The interface card 106 can include a transmitter in an uplink path for transmitting signals to a base station and a receiver in a downlink path for receiving signals from the base station. An example of an interface card 106 is a donor RF card having four channels.

In some aspects, a calibration sub-system 108 can be integrated with or otherwise disposed in the interface card 106 of a master unit 102, as depicted in FIG. 1. In additional or alternative aspects, a calibration sub-system 108 can also be disposed in one or more of the remote antenna units 104a-f.

In some aspects, installation of the DAS 100 can include using the calibration sub-system 108 to calibrate a unit of a DAS 100. In other aspects, a calibration sub-system 108 can be used to calibrate a master unit 102 or other unit of an operational DAS 100 or other telecommunication system. Operation of the DAS 100 or a unit of the DAS 100 can be paused to allow calibration of the DAS 100 using the calibration sub-system 108. The calibration sub-system 108 may include a storage medium for storing calibration data associated with various frequencies or temperatures. The calibration data can be used to calibrate the DAS 100 at regular intervals, such as a 24-hour cycle.

Figure 2:
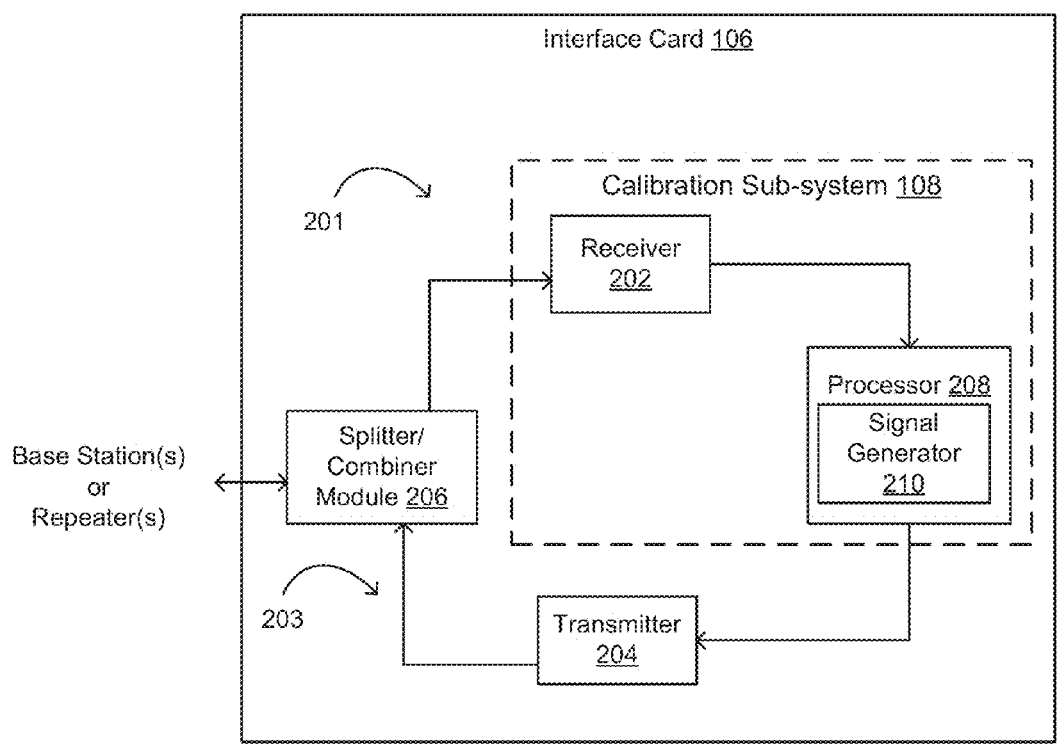
FIG. 2 is a block diagram of an interface card of a master unit having an integrated calibration sub-system according to one aspect.

FIG. 2 is a block diagram of an interface card 106 having an integrated calibration sub-system 108. The interface card 106 can include a receiver 202, a transmitter 204, a splitter/combiner module 206, a processor 208, and a signal generator 210.

The interface card 106 can include a downlink path 201 and an uplink path 203. The downlink path 201 and uplink path 203 can be coupled via the splitter/combiner module 206. A non-limiting example of a splitter/combiner module 206 is a duplexer having a coupling loss of 20 dB. The downlink path 201 and uplink path 203 can be communicatively coupled to the processor 210.

The signal generator 210 can generate test signals. The signal generator 210 can provide a test signal or other stimulus signal to the uplink path to be transmitted by the transmitter 204. A transmitter 204 can be a direct conversion transmitter. In some aspects, the signal generator 210 can be a numerically controlled oscillator. In other aspects, the signal generator 210 can be a continuous wave signal generator. In some aspects, the signal generator 210 can be integrated with or otherwise disposed in the processor 208, as depicted in FIG. 2. In other aspects, the signal generator 210 can be a separate device in communication with the processor 208. A signal generator 210 integrated with or otherwise disposed in the processor 208 can be configured via software or firmware.

Test signals generated by the signal generator 210 can be used to generate output signals. The output signals can be signals traversing the uplink path that are generated from signals transmitted by the transmitter 204 of the uplink path 203 and recovered by the receiver 202 disposed in the downlink path 201. Each output signal can have one or more signal components. Each of the signal components can have an output power. Examples of output power can include (but are not limited to) the local oscillator leakage power of the output signal and the sideband image power of the output signal.

The receiver 202 disposed in the downlink path 201 can receive an output signal generated by the transmitter 204 in the uplink path 203. In some aspects, the calibration sub-system 108 can include a single receiver 202 for measuring undesirable signal components, such as local oscillator leakage signal components and sideband image signal components. A single receiver 202 can have an operational mode for normal operation of the DAS 100 and a calibration mode for operation of the calibration sub-system 108. The receiver 202 configured for normal operation in an operational mode can be configured to receive signals from a coverage area serviced by DAS 100. The receiver 202 configured for operation of the calibration sub-system 108 in a calibration mode can be configured to receive output signals, such as transmitter-coupled output signals. The receiver 210 can be tuned or otherwise configured to receive different frequency bands, thereby allowing the receiver 210 to receive a first frequency band associated with local oscillator leakage signals and a second frequency band associated with sideband image signals.

In other aspects, the calibration sub-system 108 can include one or more dedicated receivers for measuring undesirable signal components.

The receiver 202 can be configurable such that the receiver 202 can be tuned or otherwise configured to receive frequencies used by the transmitter 204 to transmit uplink signals to one of more of the base stations or repeaters. A signal transmitted from the transmitter 204 and received by the receiver 202 can experience a gain loss of, for example, 20 dB.

The processor 208 can analyze, process, and otherwise use signals to calibrate a unit of the DAS 100. A non-limiting example of a processor 208 is a Field-Programmable Gate Array ("FPGA"). The processor 208 can determine or obtain the output power values for signal components of output signals generated from test signals. In some aspects, the processor 208 can determine the power of the signal by executing, for example, a sum of squares algorithm, a least mean square algorithm, a least squares algorithm, etc. In additional or alternative aspects, the calibration sub-system 108 can include a spectrum analyzer integrated with or communicatively coupled to the processor. The spectrum analyzer can determine the output power for signal components of the output signal. The spectrum analyzer can provide the output power for the signal components of each output signal to the processor 208.

Figure 3:
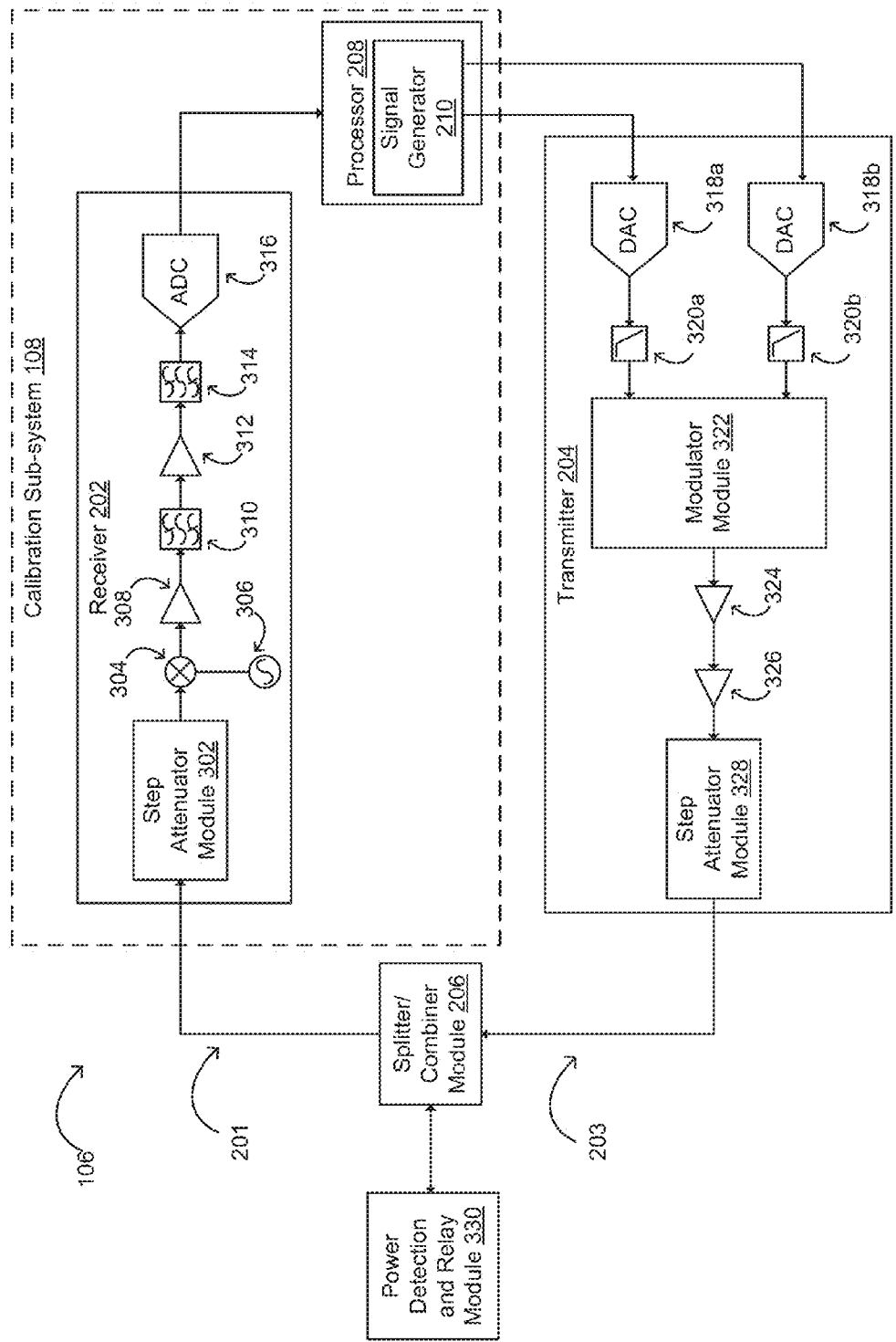
FIG. 3 is a schematic diagram of an example interface card having an integrated calibration sub-system according to one aspect.

FIG. 3 is a partial schematic diagram of an example interface card 106. The receiver 202 of the interface card 106 can include a step attenuator module 302, a mixer 304, a local oscillator 306, an amplifier 308 or other gain adjustment device, a surface acoustic wave ("SAW") filter 310, an amplifier 312 or other gain adjust device, a bandpass filter 314, and an analog-to-digital conversion device 316. The transmitter 202 of the interface card 106 can include a digital-to-analog conversion ("DAC") devices 318a, 318b, a low-pass filters 320a, 320b, a modulator module 322, an amplifier 324 or other gain adjustment device, an amplifier 326 or other gain adjustment device, and a step attenuator module 328.

The step attenuator modules 302, 328 can be configured such that the attenuation in both the uplink path 203 and the downlink path 201 of the interface card 106 is set to zero. Having the attenuation in both the uplink path 203 and the downlink path 201 set to zero can improve detection of local oscillator leakage power and sideband image power by maximizing the power of a local oscillator leakage signal coupled from the transmitter 204 to the receiver 202.

The mixer 304 and local oscillator 306 can down-convert a signal received from a base station or repeater to an intermediate frequency or baseband frequency.

The amplifier 308 and the SAW filter 310 can reduce or eliminate aliasing from the down-conversion process.

The amplifier 312 can amplify a signal received by the receiver 202. The processor 208 can configure the amplifier 312 and/or other gain adjustment devices. Amplifying the signal received by the receiver 202 can allow the calibration sub-system to process the received signal without being adversely affected by a gain loss in an output signal from the transmitter 204 to the receiver 202.

The bandpass filter 314 can isolate signals of interest to be provided to the processor 208. The bandpass filter 314 can have a narrow pass band associated with the frequency of an undesirable signal component of a signal traversing the downlink path 201. The signal can be filtered to isolate signal components related to an undesirable signal, such as a local oscillator leakage signal or a sideband image signal. For example, a bandpass filter can pass a frequency band corresponding to local oscillator leakage signals, such as a third aliasing band appearing in the center of a 100 MHz band, or a frequency band corresponding to a sideband image signal.

In additional or alternative aspects, the receiver 202 can be implemented without a bandpass filter 314, thereby allowing for tuning of the receiver 202. Rejection of a signal received by the receiver 202 can be reduced by omitting the bandpass filter 314 from the receiver 202.

The ADC ("ADC") device 316 can convert a signal traversing the downlink path 201 to a digital signal for processing by the processor 208.

As depicted in FIG. 3, the processor 208 can respectively provide an I component and a Q component for an uplink signal to the DAC devices 318a, 318b via parallel signal paths. A non-limiting example of a DAC device is a DAC3484. The DAC devices 318a, 318b can respectively modify I and/or Q component parameters, such as offset, gain, quadrature-mixing phase, and group delay. The DAC devices 318a, 318b can be configured by the processor 208 via a serial-to-parallel interface ("SPI"). The DAC devices 318a, 318b can provide analog I and Q components to the low-pass filters 320a, 320b. Parallel signal paths for the I and Q components can be combined via the modulator module 322. A non-limiting example of a modulator module 322 is a quadrature modulator.

A power detection and relay module 330 can allow for minimizing disruption during calibration by the calibration sub-system 108. A relay of the power detection and relay module 330 can be opened to perform a calibration process. A relay of the power detection and relay module 330 can be closed in response to ceasing the optimization process, thereby allowing the transmitter and receiver to operate in a normal condition.

Figure 4:
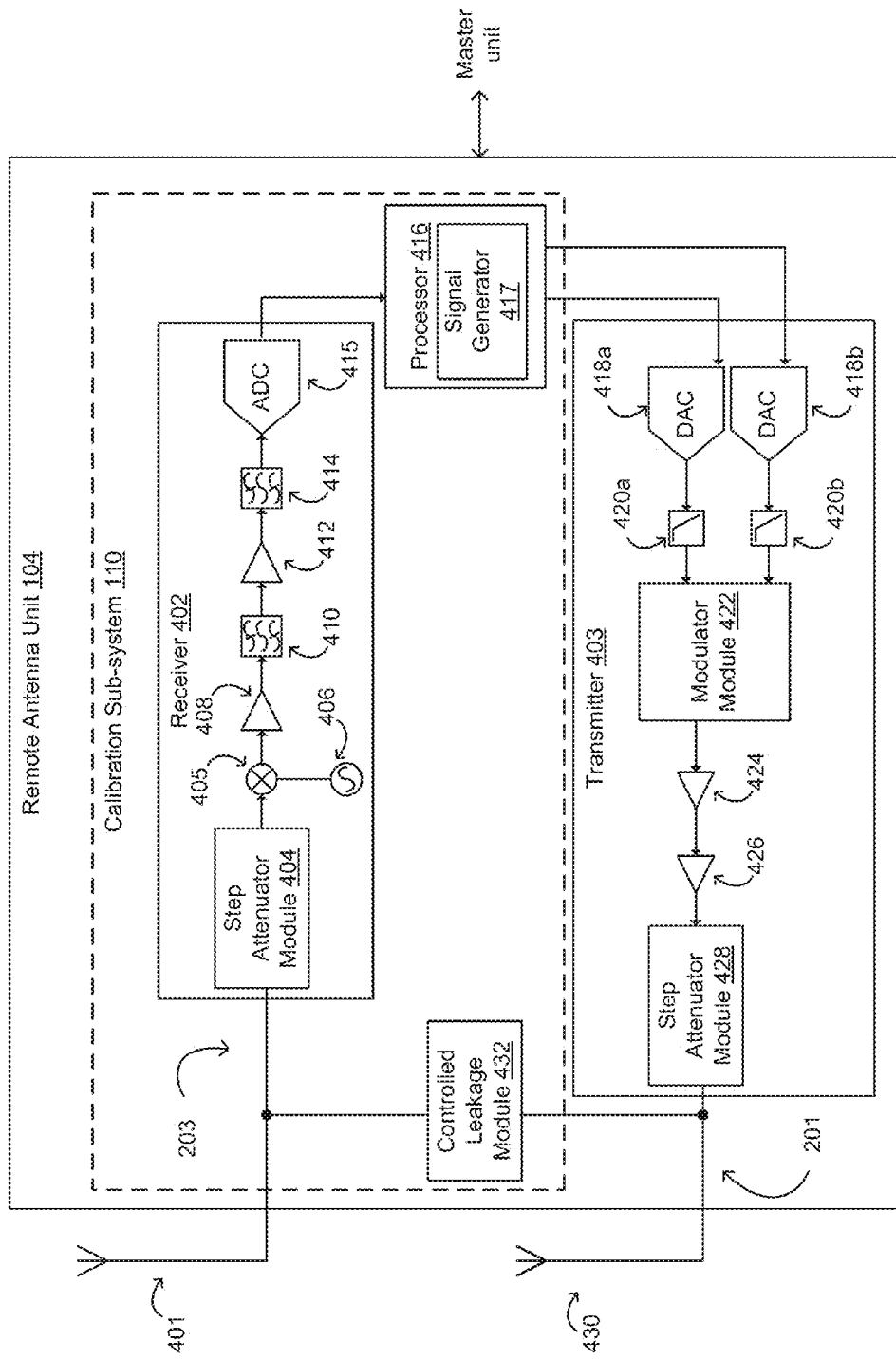
FIG. 4 is a block diagram of a remote antenna unit having an integrated calibration sub-system according to one aspect.

In additional or alternative aspects, a calibration sub-system can be disposed in a remote antenna unit. For example, FIG. 4 is a block diagram depicting a remote antenna unit 104 having an integrated calibration sub-system 110. The remote antenna unit 104 can include a receiver 402, a transmitter 403, and a processor 416. The calibration sub-system 110 can include the receiver 402, the processor 416, a signal generator 417, and a controlled leakage module 432.

The receiver 402 can include a step attenuator module 404, a mixer 405, a local oscillator 406, an amplifier 408 or other gain adjustment device, a SAW filter 410, an amplifier 412 or other gain adjust device, a bandpass filter 414, and an ADC device 415. The transmitter 403 can include a DAC devices 418a, 418b, a low-pass filters 420a, 420b, a modulator module 422, an amplifier 424 or other gain adjustment device, an amplifier 426 or other gain adjustment device, and a step attenuator module 428.

The step attenuator modules 404, 428 can be configured such that the attenuation in both the uplink path and the downlink path set to zero. Having the attenuation in both the uplink path and the downlink path set to zero can improve detection of local oscillator leakage power and sideband image power by maximizing the power of a local oscillator leakage signal coupled from the transmitter 403 to the receiver 402.

The mixer 405 and local oscillator 406 can down-convert a signal received from a communication device in a coverage area serviced by a DAS 100 to an intermediate frequency. The amplifier 408 and the SAW filter 410 can reduce or eliminate aliasing from the down-conversion process.

The amplifier 412 can amplify a signal received by the receiver 402. The processor 416 can configure the amplifier 412 and/or other gain adjustment devices. Amplifying the signal received by the receiver 402 can allow the calibration sub-system 110 to process the received signal without being adversely affected by a gain loss in an output signal from the transmitter 403 to the receiver 402.

The bandpass filter 414 can isolate signals of interest to be provided to the processor 416. The bandpass filter 414 can have a narrow pass band associated with the frequency of an undesirable signal component of a signal traversing the downlink path. The signal can be filtered to isolate signal components related to an undesirable signal, such as a local oscillator leakage signal or a sideband image signal. For example, the bandpass filter 414 can pass a frequency band corresponding to local oscillator leakage signals, such as a third aliasing band appearing in the center of a 100 MHz band, or a frequency band corresponding to a sideband image signal.

The ADC device 415 can convert a signal traversing the downlink path to a digital signal for processing by the processor 416.

As depicted in FIG. 4, the processor 416 can respectively provide an I component and a Q component for downlink signal to the DAC devices 418a, 418b via parallel signal paths. A non-limiting example of a DAC device is a DAC3484. The DAC devices 418a, 418b can respectively modify I and/or Q component parameters, such as offset, gain, quadrature-mixing phase, and group delay. The DAC devices 418a, 418b can be configured by the processor 416 via a SPI. The DAC devices 418a, 418b can provide analog I and Q components to the low-pass filters 420a, 420b. Parallel signal paths for the I and Q components can be combined via the modulator module 422. A non-limiting example of a modulator module 422 is a quadrature modulator.

The controlled leakage module 432 can provide a controlled leak signal path from a transmitter 403 to a receiver 402 and in parallel with a coupling path between a receiver antenna 401 and a transmitter antenna 430. The controlled leakage module 432 can be configured such that the controlled leakage signal path has a different coupling loss for a normal operation mode than the coupling loss for a calibration mode. The controlled leakage signal path having a different coupling loss for a normal operation mode than the coupling loss for a calibration mode can facilitate execution of a calibration process or other optimization process in the presence of interfering signals. The controlled leakage module 432 can allow intentional leakage for the benefit of automatic nulling of local oscillator leakage and sideband image components.

Figure 5:
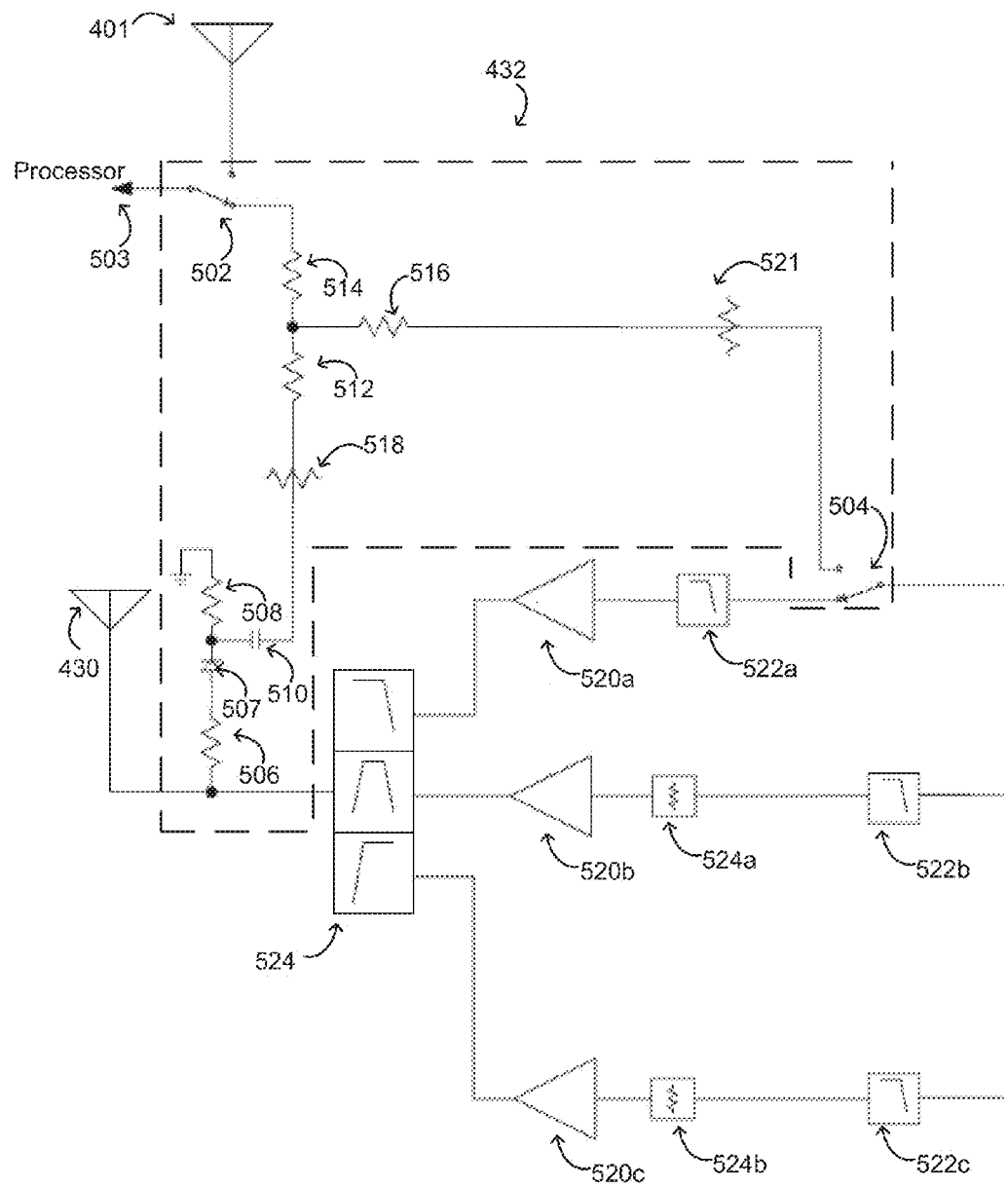
FIG. 5 is a schematic diagram of an example controlled leakage module of a calibration sub-system for a remote antenna unit according to one aspect.

FIG. 5 is a schematic diagram of an example controlled leakage module 432. The controlled leakage module 432 depicted in FIG. 5 can include switches 502, 504, resistors 506, 508, 512, 514, 516, a capacitor 510, and attenuators 518, 520.

A remote antenna unit 104 can include any number of downlink signal paths having any suitable signal processing and/or modification devices (including one). For example, FIG. 5 depicts multiple downlink paths coupled to a triplexer 524. A first downlink path can include a power amplifier 520a and a low-pass filter 522a. A second downlink path can include a power amplifier 520b, a low-pass filter 522b, and an attenuation device 524b. A third downlink path can include a power amplifier 520c, a low-pass filter 522c, and an attenuation device 524c.

As depicted in FIG. 5, a test signal can be provided to the processor 416 as a controlled leakage signal. The controlled leakage signal can be sampled following the triplexer 524 for selecting between downlink paths in which power amplifiers 520a-c are disposed. A biasing AC voltage can be applied to the diode 507 via a biasing resistor 506. Biasing the diode 507 can allow current to flow through the RC circuit provided by the resistor 508 and the capacitor 510, thereby allowing a controlled leakage signal to be provided from the downlink path 201 to the uplink path 203. An attenuator 518 can attenuate the controlled leakage signal as needed. A switch 502 can be actuated to couple the controlled leakage signal to the processor via a path including output 503. The switch 502 can be controlled by the processor 416. The switch 502 can disconnect the receiving antenna 401 such that the remote antenna unit 104 does not receive uplink signals during a calibration process.

The controlled leakage module 432 can also allow a controlled leakage signal to be sampled prior to a low-pass filter 522a in a downlink path. A switch 504 can be actuated by the processor 416 to selectively provide a controlled leakage signal to the processor 416. An attenuator 521 can attenuate the controlled leakage signal as needed.

Although FIG. 5 depicts a controlled leakage module 432 that can provide a controlled leakage signal via a switch before and after a power amplifier of a downlink path, other implementations are possible. In some aspects, the path including the switch 504, the attenuator 521, and the resistor 516 can be omitted.

Figure 6:
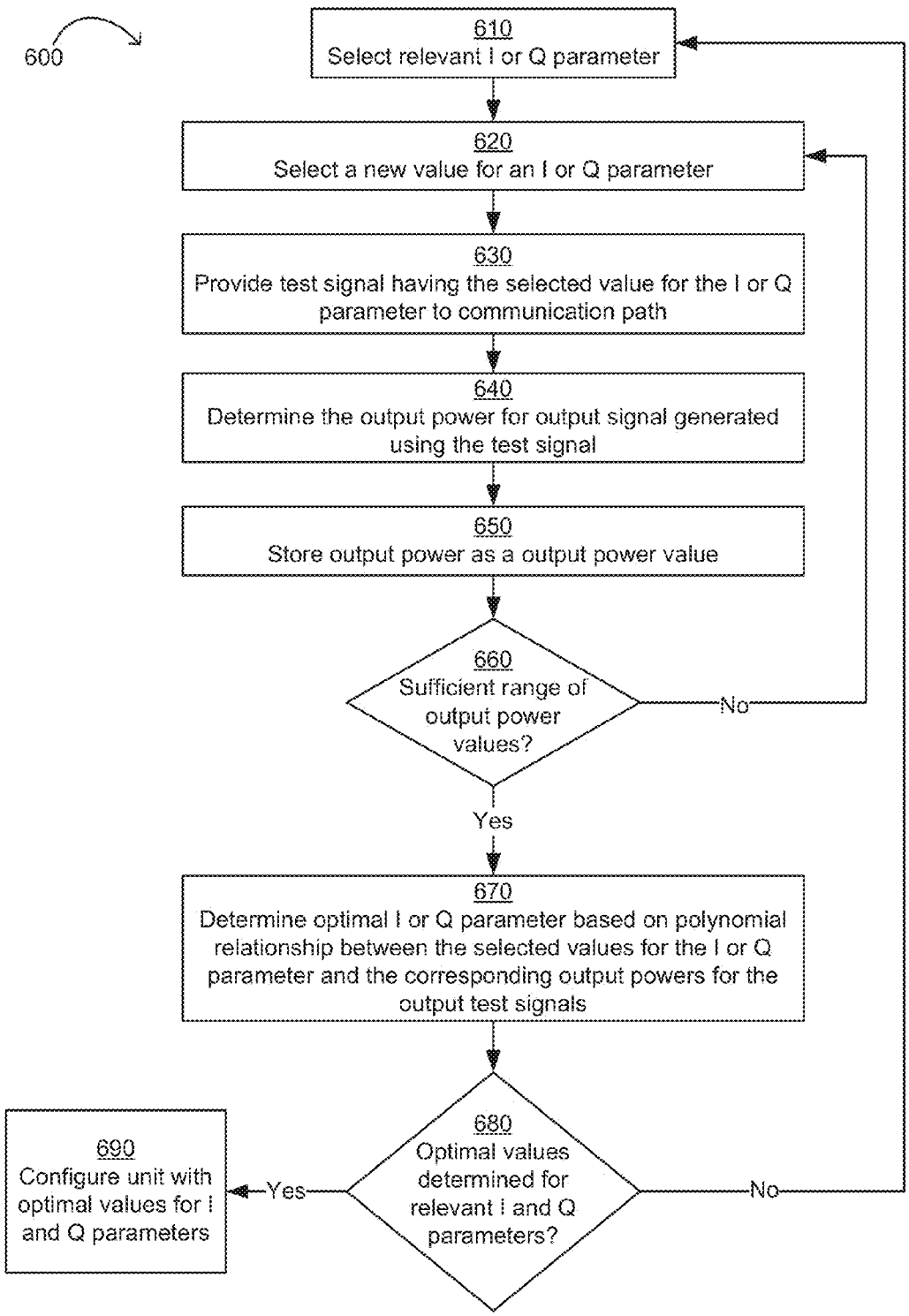
FIG. 6 is a flow chart of a process for calibrating a telecommunication system according to one aspect.

One or both of the calibration sub-systems 108, 110 can perform a calibration process or other optimization process. FIG. 6 is a flow chart of a calibration process 600.

At block 610, a relevant I or Q parameter is selected. The processor 208 or the processor 416 can select the relevant I or Q parameter. The processor 208 or the processor 416 can select the I or Q parameter for which the value is to be modified based on an undesirable signal component of an output signal to be analyzed. The relevant I and/or Q component parameters include the I component parameters and the Q component parameters that affect the output power of an undesirable output signal component. The relevant I and/or Q component parameters for minimizing the power of a local oscillator leakage signal can include the offset for the I component of a test signal and the offset for the Q component of a test signal. The relevant I and/or Q component parameters for minimizing the power of a sideband image signal can include the gain of the I component of a test signal, the gain of the Q component of a test signal, the quadrature-mixing phase, and group delay of a test signal.

At block 620, a modification scheme for an I or Q parameter is selected. One example of a modification scheme involves the processor 208 or the processor 416 selecting a value for an offset of the I component or the Q component of a test signal to determine an output power of a local oscillator leakage signal. Another example of a modification scheme involves the processor 208 or the processor 416 selecting a value for a gain of the I component or the Q component to determine an output power of a sideband image signal. Another example of a modification scheme involves the processor 208 or the processor 416 selecting a value for the quadrature-mixing phase delay of a test signal.

In some aspects, the calibration process 600 can include multiple iterations. In a first iteration, the processor 208 or the processor 416 can select a value for an I or Q parameter arbitrarily. In one or more additional iterations, the processor 208 or the processor 416 can select a value for an I or Q parameter based on a determined optimal value of the I or Q offset in a prior iteration.

At block 630, a test signal having the selected value for the I or Q parameter is provided to a communication path. The processor 208 or the processor 416 can respectively configure the signal generator 210 or the signal generator 417 to generate the test signal having the selected value for the I or Q parameter.

At block 640, an output power for an output signal is determined. An output signal can be generated in the communication path from the test signal provided by the signal generator 210 or the signal generator 417. The output signal can be filtered by a bandpass filter 314 or a bandpass filter 414. The pass band of the bandpass filter can correspond to an output signal to be analyzed. Data samples representing the output signal can be provided to the processor 208 or the processor 416.

At block 640, the output power of the output signal is stored as an output power value. The output power value can be stored in any suitable computer-readable medium accessible by the processor 208 or the processor 416. For example, the output power value can be stored in a random access memory of an interface card 106 in a master unit 102 or a random access memory disposed in the remote antenna unit 104.

At block 660, it is determined whether a sufficient range of output power values is stored. The processor 208 or the processor 416 can determine whether a sufficient range of output power values is stored. A sufficient range of output power values can be a range of output power values that can be fitted to an $(n-1)^{th}$ order polynomial. In some aspects, for instance, fitting to a $2^{nd}$ order polynomial, a sufficient range of output power values can be three output power values with at least one output power value positioned to the left of the minimum of a quadratic curve and at least one output power value positioned to the right of the minimum of a quadratic curve.

If a sufficient range of output power values is not stored, the calibration process 600 can return to block 620. A different value for an I or Q parameter is selected.

If a sufficient range of output power values is stored, the optimal value for the I or Q parameters is determined at block 670. The processor 208 or the processor 416 can determine a respective optimal value for each of the I parameters and the Q parameters based on the output power values and the polynomial function associated with the output power values and the I parameters and the Q parameters. The respective optimal value can be a value for a respective I or Q parameter resulting in a minimal output signal power. The processor 208 or the processor 416 can determine an optimal value by determining the polynomial function corresponding to the output signal powers of output signals and determining the values for a respective I or Q parameter for a respective input test signal that result in the minimum value of the polynomial function. For example, the equations below represent the output signal powers of output signals 1 through m using the variables $y_m$ and represent the respective I or Q parameter for a respective input test signal by the variables $x_m$ $$\begin{cases} y_1 = a_{n-1}x_1^{n-1} + a_{n-2}x_1^{n-2} + \ldots + a_1x_1 + a_0 \\ y_2 = a_{n-1}x_2^{n-1} + a_{n-2}x_2^{n-2} + \ldots + a_1x_2 + a_0 \\ \vdots \\ y_m = a_{n-1}x_m^{n-1} + a_{n-2}x_m^{n-2} + \ldots + a_1x_m + a_0 \end{cases}$$

By representing $y=[y_1, y_2, y_3 \ldots y_m]^T$ and $a=[a_0, a_1, a_2 \ldots a_{n-1}]^T$ as column vectors and the variable $x_m$ as a matrix $$X = \begin{bmatrix} 1 & x_1 & \ldots & x_1^{n-2} & x_1^{n-1} \\ 1 & x_2 & \ldots & x_2^{n-2} & x_2^{n-1} \\ \vdots & \vdots & \ddots & \vdots & \vdots \\ 1 & x_m & \ldots & x_m^{n-2} & x_m^{n-1} \end{bmatrix}$$

the set of m linear equations can be represented by the equation $Xa=y$

For n being equal to m, the solution to the n coefficients of the Taylor series or polynomial can be represented by the equation $a=X^{-1}y$ For n being less than m, the solution to the n coefficients of the Taylor series or polynomial can be represented by the equation $a=(X^TX)^{-1}X^Ty$ For n being greater than m, the solution to the n coefficients of the Taylor series or polynomial can be represented by the equation $$a = X^T(X^TX)^{-1}y$$

Upon obtaining the Taylor series coefficients, numerical methods can be applied to search for the local and global minimum of the output power function, thereby determining the optimal I or Q component parameters.

In cases where the coefficients of higher order terms of the Taylor series are negligible, the set of equations can be simplified to the following:

$$y_1 = ax_1^2 + bx_1 + c$$

$$y_2 = ax_2^2 + bx_2 + c$$

$$y_3 = ax_3^2 + bx_3 + c$$

The optimal value $x_{optimal}$ for an I or Q parameter can be determined by calculating $x_{optimal} = -b/2a$.

The calibration sub-systems 108, 110 can reduce local oscillator leakage power by determining optimal values for the offsets of the I and Q components. An optimal value for the offset of the I component can be determined using test signals having a zero value for the offset of the Q component. In other aspects, an optimal value for the offset of the Q component can be determined using test signals having the optimal value determined for the offset of the I component. In other aspects, an optimal value for the offset of the Q component can be determined using test signals having a zero value for the offset of the I component.

The calibration sub-systems 108, 110 can reduce sideband image power by determining optimal values for the gains of the I and Q components and an optimal value for the quadrature-mixing phase. An optimal value for the gain of the I component can be determined using test signals having a zero value for the gain of the Q component. An optimal value for the gain of the Q component can be determined using test signals having a constant value, such as zero, for the gain of the I component. An optimal value for the quadrature-mixing phase of the I component can be determined using test signals having a constant value, such as zero, for the phase of the Q component.

At block 680, it is determined whether optimal values have been determined for all relevant I and/or Q component parameters. Determining whether optimal values have been determined for all relevant I and/or Q component parameters can include determining whether optimal values for the I and/or Q component parameters have been determined such that both the power of a local oscillator leakage signal and the power of a sideband image signal are minimized. If optimal values have not been determined for all relevant I and/or Q component parameters, the calibration process 600 can return to block 610 and the next relevant I or Q parameter can be selected. For example, if the processor 208 or the processor 416 has determined the optimal value for the offset of the I component and has not determined the optimal value for the offset of the Q component of a test signal, the processor 208 or the processor 416 can select the offset of the Q component as the I or Q parameter to be optimized.

If optimal values have been determined for all relevant parameters for the I and/or Q components, the master unit 102 and/or the remote antenna unit 104 is configured with the optimal values for the I component parameters and the Q component parameters at block 690. For example, the processor 208 can configure one or more of the a DAC devices 318a, 318b to modify signals such that each signal provided to the uplink path has optimal values for the I and Q components. The processor 416 can configure one or more of the DAC devices 418a, 418b to modify signals such that each signal provided to the downlink path has optimal values for the I and Q components. Configuring a DAC device can include providing a control signal to the transmitter having the DAC device.

In additional or alternative aspects, the calibration sub-systems 108, 110 can determine an optimum modification scheme for optimizing the differential delay of the I and Q components such that the differential phase between the I and Q components is minimized. A differential phase can be a difference in the optimal phase setting determined using the process 600 for a first test signal having a frequency at or near the minimum frequency of a frequency band of interest and a second test signal having a frequency at or near the maximum frequency of a frequency band of interest. A differential phase of zero corresponds to the delay of the I component signal path and the Q component signal path being equally matched. A differential delay can include the difference between delay compensation settings of the I component signal path and the Q component signal path. In a master unit 102, the DAC devices 318a, 318b can be configured with delay compensation settings by the processor 208. In a remote antenna unit 104, the DAC devices 418a, 418b can be configured with delay compensation settings by the processor 416.

The differential delay can be the derivative of a phase shift (i.e., a slope of the phase shift curve in a linear phase system). Optimizing the differential delay (e.g., matching a delay between the I and Q components) can include matching phase shift slopes across a frequency band of interest and matching a phase at a single frequency, such that identical phase shifts are obtained across the frequency band of interest. Matching a delay between the I and Q components can provide image rejection in a DAC device at multiple frequencies within a frequency band of interest.

Figure 7:
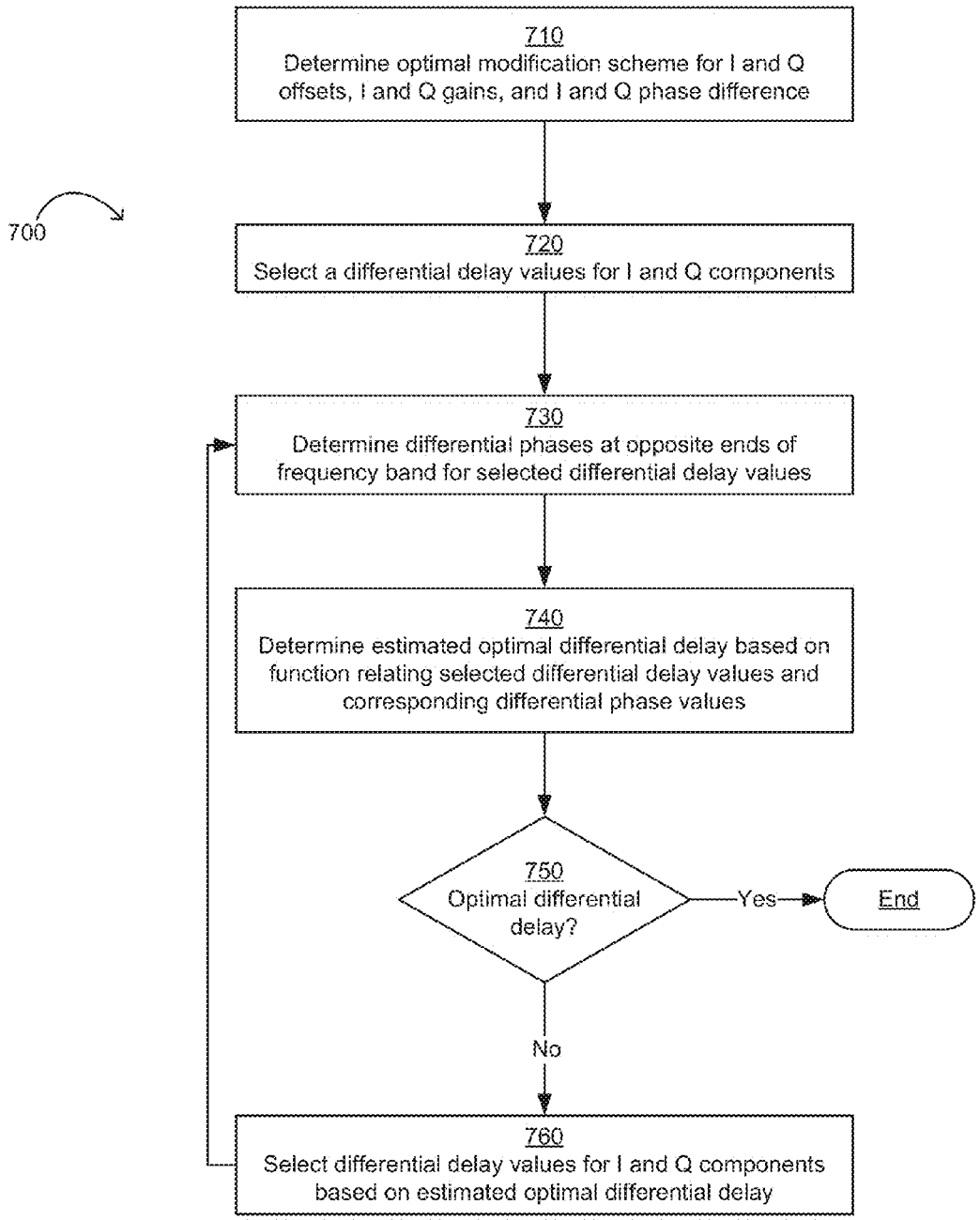
FIG. 7 is a flow chart of a process for optimizing differential delay in calibrating a telecommunication system according to one aspect.

FIG. 7 is a flow chart depicting an example process 700 for optimization of a differential delay between an I component and a Q component. The process 700 can be performed by one or both of the calibration sub-systems 108, 110.

At block 710, the process 600 is performed to obtain an optimal modification scheme with respect to the respective offsets of the I and/or the Q components, the respective gains of the I and/or the Q components, and the quadrature-mixing phase difference between the I and Q components.

At block 720, differential delay values between an I component and a Q component are selected. In some aspects, the differential delay can be adjusted by configuring one or more of the DAC devices 318a, 318b or the DAC devices 418a, 418b with a modified delay setting. In additional or alternative aspects, the differential delay can be adjusted by adding and/or modifying a delay setting for one or more of the I or Q components in a processor 208 or a processor 416. In some aspects, the differential delay values can be selected based on input received from an operator via an external control device. In other aspects, the processor 208 or the processor 416 can automatically select the differential delay values without input received from an operator.

The differential delay values can be any values within the configurable range of delay values for a component introducing the differential delay. For example, a digital-to-analog conversion device may have a configurable range of delay values from −256 to +256. A set of differential delay values can be selected from a lower end of the range at or near −256, a middle portion of the range of values at or near 0, and an upper portion of the range at or near +256. Using a wider range of differential delay values for the initial iteration of the process 700 may provide less accurate estimates of an optimum differential delay value. In some aspects, additional iterations of the process 700 may be performed based on using a wider range of differential delay values for the initial iteration of the process 700.

The processor executing the process 700 can select a sufficient range of delay values and corresponding differential phase values. A sufficient range of differential phase values can be a range of differential phase values that can be used to interpolate, extrapolate, or otherwise determine a point at which a function relating the differential phase values to the differential delay values provides a zero value for the differential phase value. A function relating the differential phase values to the differential delay values can include a simple polynomial curve fit or any other suitable curve-fitting and root-finding function. In some aspects, a sufficient range of differential phase values can be two differential phase values. In other aspects, a sufficient range of differential phase values can be greater than two differential phase values such that a higher-order and/or more complex curve-fitting and root-finding function may be determined.

At block 730, a respective differential phase is determined for frequencies at opposite ends of a frequency band of interest for each differential delay value selected at block 720. A first optimum phase is determined for a first test signal at or near a minimum frequency of the frequency band of interest. A second optimum phase is determined for a second test signal at or near a maximum frequency of the frequency band of interest using the selected delay. The optimum phases can be determined by performing the process 600 to obtain an optimal modification scheme with respect to the quadrature-mixing phase difference between the I and Q components.

In some aspects, one of the test signals can be provided to the downlink path or other communication path after an optimum phase for a second test signal is determined. In other aspects, the first test signal and the second test signal can be provided to the downlink path or other communication path simultaneously or contemporaneously within a period of time prior to determining each optimum phase. The first and second test signals can be provided contemporaneously by selecting frequencies for the test signals that do not generate overlapping images. For example, a first test signal can have a frequency of 35 MHz relative to a carrier frequency and a second test signal can have a frequency of −30 MHz relative to the carrier frequency.

At block 740, an estimated optimum differential delay value is determined. The processor executing the process 700 can determine an estimated optimum differential delay value.

An optimum differential delay value can be a delay value that corresponds to a differential delay setting which results in a differential phase of zero. For example, an optimum differential delay value may be a delay value for which a function relating each differential delay selected at block 720 and each corresponding differential phase determined at block 730 outputs a zero value for the differential phase.

In some aspects, an estimated optimum differential delay can be determined based on interpolation using a function relating differential delay values to differential phase values. For example, interpolation may be used to determine a differential delay value for a zero-crossing that is between the minimum differential delay value selected at an iteration of block 720 and the maximum differential delay value selected at an iteration of block 720.

In other aspects, an estimated optimum differential delay can be determined based on extrapolation using a function relating differential delay values to differential phase values. For example, extrapolation may be used to determine a differential delay value for a zero-crossing that is less than the minimum differential delay value selected at an iteration of block 720 or greater than the maximum differential delay value selected at an iteration of block 720.

At block 750, it is determined whether an optimum differential delay has been obtained. The processor executing the process 700 can determine whether an optimal differential delay has been obtained. Determining whether an optimum differential delay value has been obtained can include determining a differential phase using the estimated optimum differential delay value. The estimated optimum differential delay value providing a differential phase at or near zero can indicate that an optimum differential delay value has been obtained.

If an optimal differential delay has not been obtained, new differential delay values are selected based on the estimated optimum differential delay value at block 760. For example, differential delay values can be selected at block 760 that are grouped around the estimated optimum differential delay value.

If an optimal differential delay has been obtained, the process 700 ends.

The process 700 can be performed iteratively based on the determination at block 750. For example, a first iteration of the process 700 can select differential delay values at block 720 at random or based on any suitable criteria. For example, three differential delay settings can be selected at random from a range of configurable differential delay settings. The first iteration can provide a first optimum differential delay value for a function determined using the randomly selected differential delay values. A second iteration of the process 700 can select differential delay values at block 760 grouped around the first optimum differential delay value. The second iteration can provide a second optimum differential delay value for a function determined using the differential delay values grouped around the first optimum differential delay value. For example, three differential delay values can be selected from a smaller range of values than the differential delay values selected in the first iteration. The smaller range of values can be centered on the first optimum differential delay value. In some aspects, the process 700 can be performed iteratively until an optimum differential delay value from each subsequent iteration converges to a constant value. In other aspects, the process 700 can be performed iteratively until an optimum differential delay value does not change by more than a threshold value in each subsequent iteration.

In additional or alternative aspects, an optimum phase can be determined for a test signal having a frequency at or near the center of the frequency band of interest using the optimum differential delay value.

Figure 8:
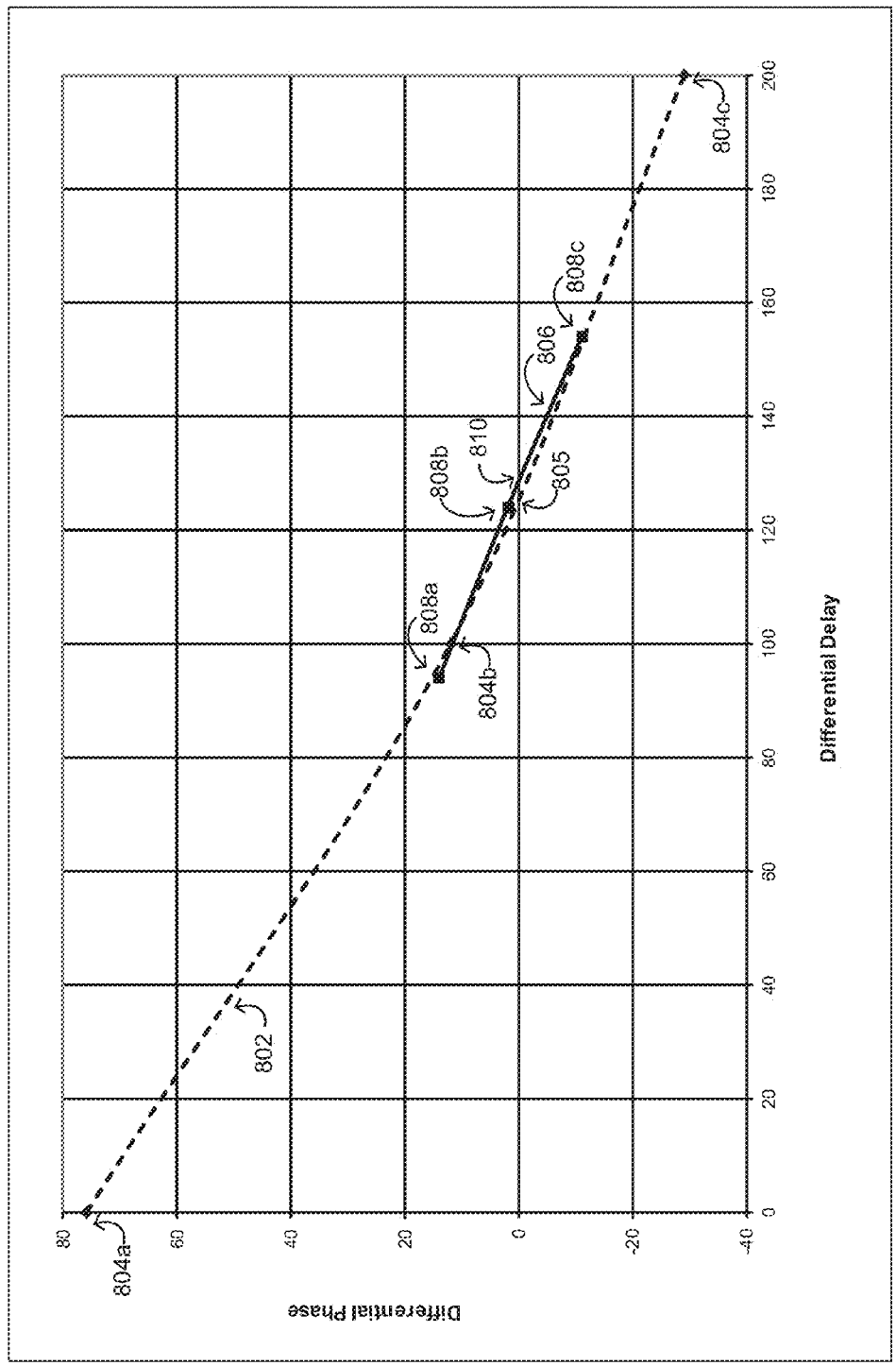
FIG. 8 is a graph depicting example results of a process for optimizing differential delay in calibrating a telecommunication system according to one aspect.

For example, the graph of FIG. 8 depicts the results of two iterations of the process 700. Results for the first iteration are depicted by the dashed line 802 including points 804*a-c*. The first iteration using widely spaced differential delay values of 0, 100, and 200 can be used to generate a function that provides a predicted zero crossing for a differential delay value of 124 depicted at point 805. Actual measurements of a differential phase using this differential delay setting may result in a non-zero differential phase value. Results for a second iteration are depicted by the dashed line 806 including points 808*a-c*. A second iteration using three more closely spaced differential delay settings (e.g., with differential delay values of 124, 94, and 154) can provide a more accurate optimum differential delay value for which a zero crossing corresponding to a minimum differential phase is obtained. For example, as depicted in FIG. 8 by, point 810, the second iteration provides an optimum differential delay value of 129. A measurement of the differential phase using a differential delay value of 129 may result in a differential phase of zero.

FIGS. 9-13 depict examples of frequency spectra of complex signals optimized using one or both of the calibration sub-systems 108, 110.

Figure 9:
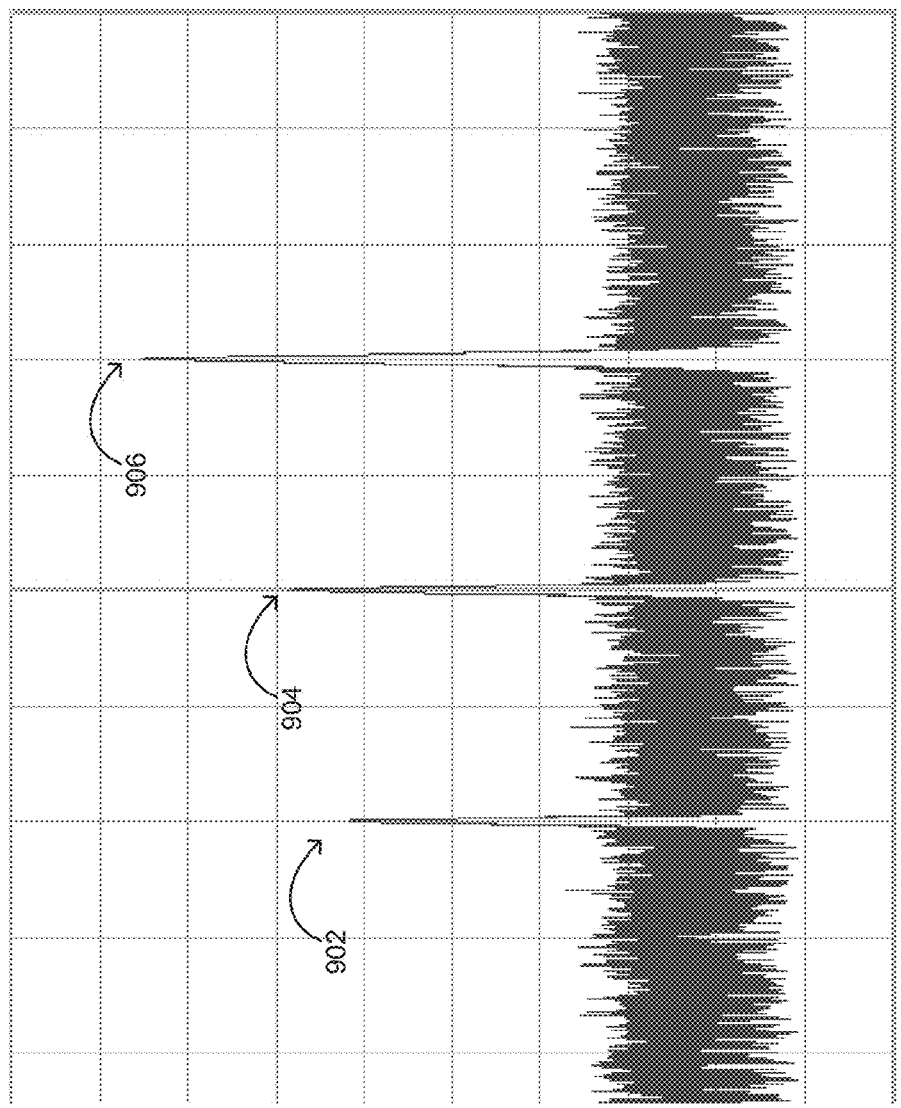
FIG. 9 is a diagram depicting an example frequency spectrum of a signal prior to performing a calibration process according to one aspect.

FIG. 9 depicts an example frequency spectrum prior to performing a process 600. The frequency spectrum includes a sideband image signal component 902 and a local oscillator leakage signal component 904 generated by an input signal 906.

Figure 10:
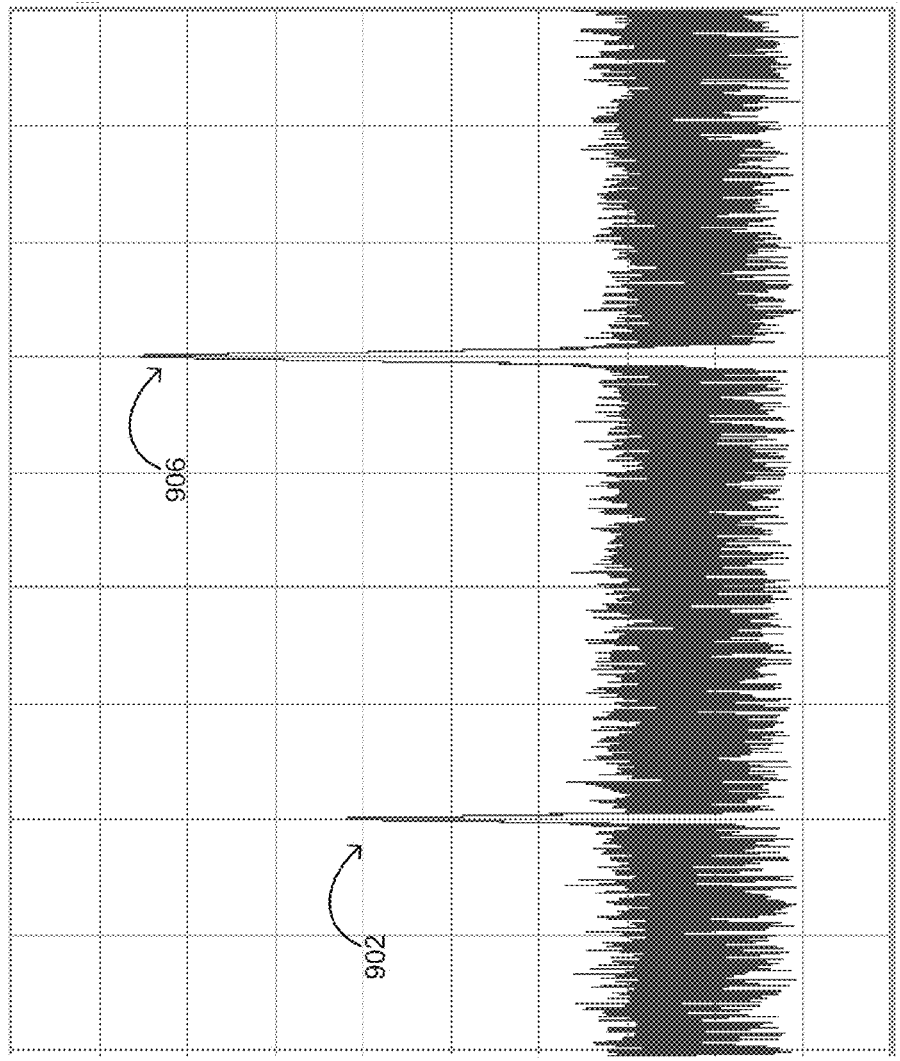
FIG. 10 is a diagram depicting an example frequency spectrum of a signal after performing a calibration process for optimizing the offsets of an in-phase ("I") and quadrature component ("Q") of a complex signal according to one aspect.

FIG. 10 depicts an example frequency spectrum after performing a calibration process 600 for optimizing the offsets of the I and Q components of the input signal 906. Optimizing the offsets of the I and Q components of the input signal 906 signal can reduce or eliminate the local oscillator leakage signal component 904 generated by an input signal 906.

Figure 11:
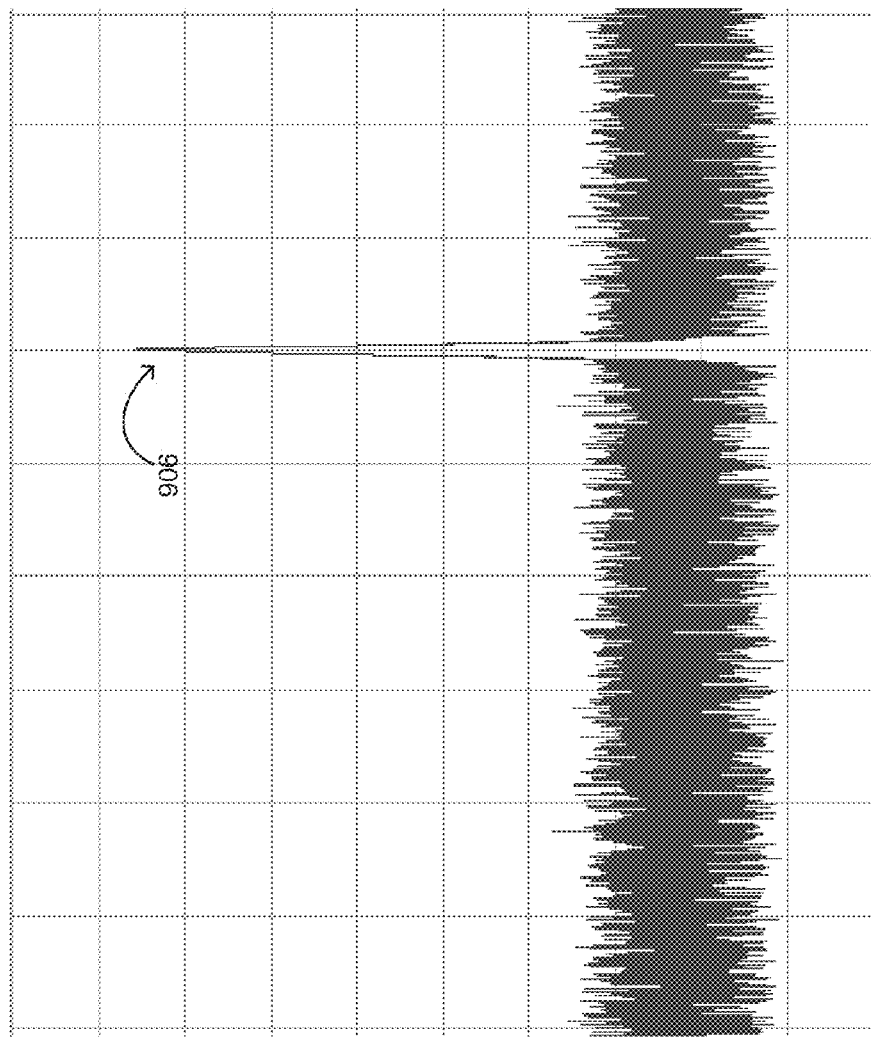
FIG. 11 is a diagram depicting an example frequency spectrum of a signal after performing a calibration process for optimizing the gains of the I and Q components and the quadrature-mixing phase difference between the I and Q components of a signal according to one aspect.

FIG. 11 depicts an example frequency spectrum of a signal after performing a calibration process 600 for optimizing the gains of the I and Q components and the quadrature-mixing phase difference between the I and Q components of the input signal 906. Optimizing the gains of the I and Q components and the quadrature-mixing phase difference between the I and Q components can reduce or eliminate the sideband image signal component 902.

Figure 12:
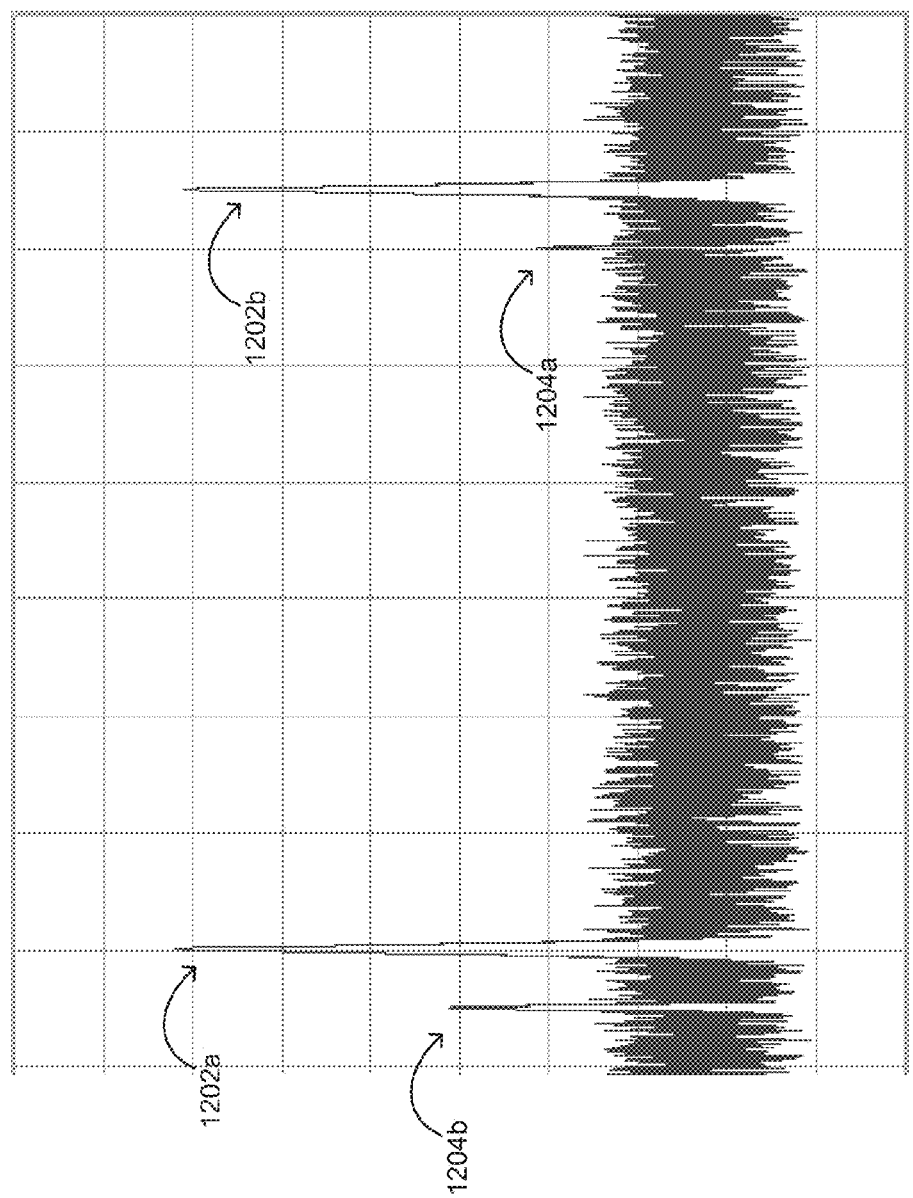
FIG. 12 is a diagram depicting an example frequency spectrum of a signal prior to performing a process for optimizing differential delay according to one aspect.
Figure 13:
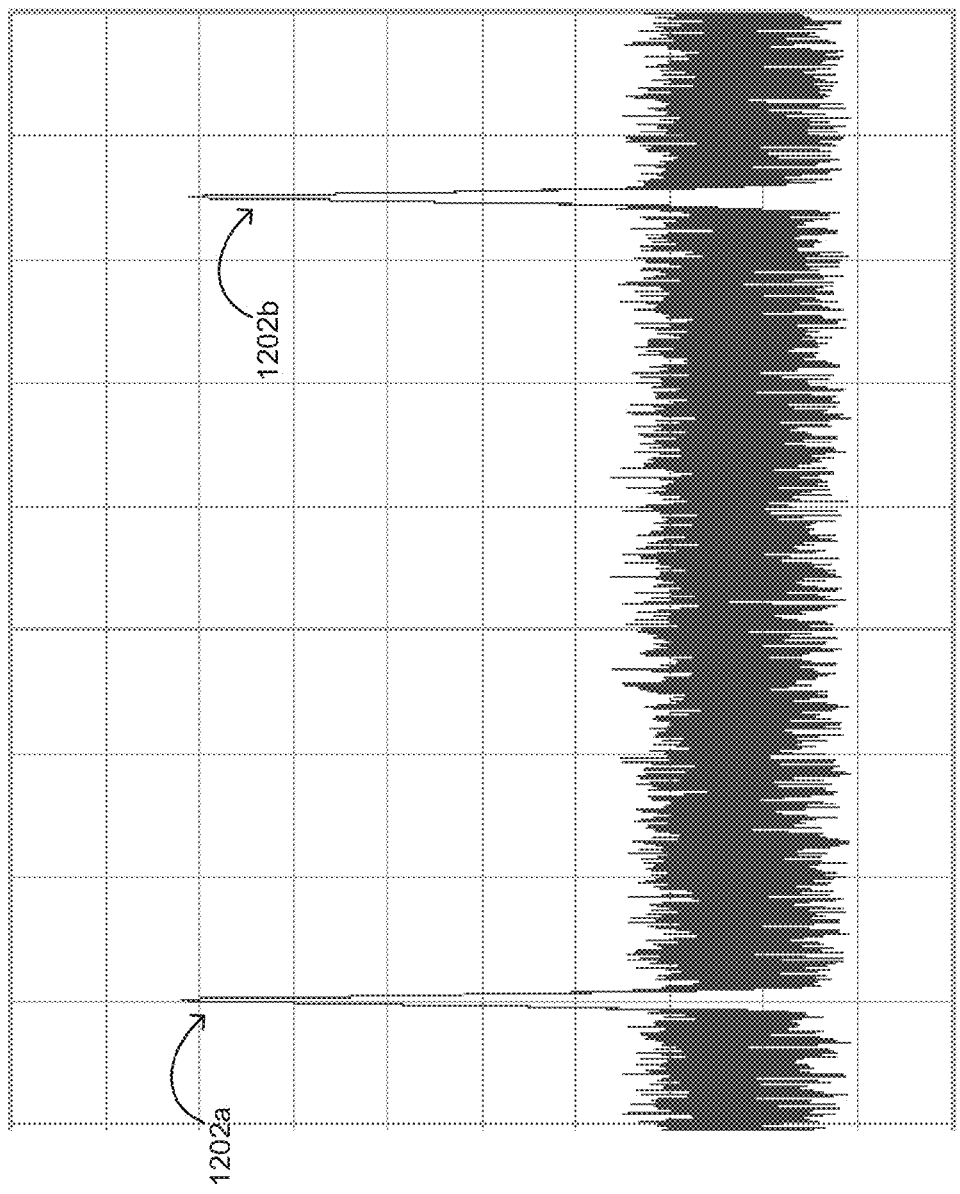
FIG. 13 is a diagram depicting an example frequency spectrum of a signal after performing a process for optimizing differential delay according to one aspect.

FIG. 12 depicts an example frequency spectrum including input signals 1202a, 1202b prior to performing a process 700 for optimizing differential delay. Sideband image signal components 1204a, 1204b are depicted in FIG. 12. FIG. 13 is a diagram depicting the example frequency spectrum after performing the process 700. Optimizing the differential delay can reduce or eliminate the image signal components 1204a, 1204b across the frequency band of interest.

Remote Antenna Unit

In additional or alternative aspects, using a calibration sub-system 110 in a remote antenna unit 104 can require additional processing to address differences between a transceiver for a remote antenna unit 104 and a transceiver for an interface card 106 of a master unit 102. A remote antenna unit 104 can have a coupling loss of 40 dB from a transmitter 403 to receiver 402, as compared to an interface card 106 of a master unit 102 that can have 20 dB loss at a power combiner/splitter between a transmitter 204 and a receiver 202. A remote antenna unit 104 can also lack a relay to shield the receiver 402 from potential interfering signals that are present in a transmit band used by the transmitter 403 of the remote antenna unit 104.

A receiver 402 of the remote antenna unit 104 can receive interfering signals, such as signals from neighboring devices, at frequencies at or near the frequency of calibration sub-system 110 used by the calibration sub-system 110. Examples of neighboring devices can include, but are not limited to, surrounding remote antenna units, base stations, and/or repeaters. In some aspects, the calibration sub-system 110 can distinguish output signals from interfering signals by modulating test signals with identifier data, such as a pseudo-random sequence or other type of identifier data. For example, the calibration sub-system 110 may include a correlator device or demodulator device for identifying output signals having the identifier data, thereby distinguishing output signals from interfering signals. In other aspects, the test signal generator 417 can provide two carrier signals for the transmitter 403 of the remote antenna unit 104 having the frequencies of each carrier signal modified over time. In other aspects, a synthesizer can go through a wobble or step in frequency forward and backward. For example, the receiver 402 of the calibration sub-system 110 can be synchronized with the change in frequency, thereby allowing the calibration sub-system 110 to distinguish the output signal from other interfering signals.

For example, a source of interference can be a transmitter 403 of a remote antenna unit 104 transmitting signals to mobile units in a common time division duplexing ("TDD") frequency band. FIG. 14 is a chart depicting example values for local oscillator leakage power and sideband image power for a remote antenna unit 104 calibrated using a calibration sub-system 110. The table of FIG. 14 depicts the results of a calibration process performed using a first frequency of 1000 MHz for a test signal. For TDD frequency band information known to the master unit 102, a calibration sub-system 110 can be configured to use test signals at frequencies below or above the TDD band. For example, as depicted in FIG. 14, the calibration process can involve the frequency being shifted by increments of 5 MHz to other frequencies in the table. The values for the local oscillator leakage power and the sideband image power in the table depicted in FIG. 14 correspond to the shifted frequencies, thereby illustrating the impact of a frequency offset. The impact of a 10-15 MHz offset to the frequency of a test signal may result in no difference to the determination of optimal I and/or Q component parameters for minimizing the power of local oscillator leakage signals and sideband image signals. Sideband image cancellation is not sensitive with the change of frequency, as depicted in the table in FIG. 14.

Another source of interference can include neighboring devices transmitting neighboring signals at downlink frequency used by a calibration sub-system 110 for an output signal. Examples of neighboring devices can include, but are not limited to, base stations, repeaters and/or remote antenna units of a common cell or coverage area and/or neighboring cells or coverage area. A neighboring signal can cause interference to a calibration sub-system 110 that cannot distinguish between the neighboring signals and output signals. In some aspects, for a bandwidth that is less than 30 MHz, the test frequency for a test signal and the resulting output signals can be adjusted by an offset of 15 MHz.

The results of white noise present in the frequency band for cancellation is depicted in the table of FIG. 15. The table of FIG. 15 includes white noise power having values depicted in the left column. The calibration process can be performed for respective values of the white noise power included in the left column of the table of FIG. 15. The table of FIG. 15 includes values for the local oscillator leakage power in the middle column and values for the sideband image power in the right column. The values for the local oscillator leakage power and the values for the sideband image power correspond to respective values for white noise power, thereby illustrating the relationship between white noise and performance of the calibration sub-system. White noise power is measured against the single tone power. For interfering signals having a signal power of −40 dBc, the effectiveness of the process depicted in FIG. 6 can be unaffected. Interfering signals having a signal power of above −30 dB relative to a single tone (−11 dBm) can reduce the effectiveness of the process depicted in FIG. 6.

In some aspects, information about a transmit frequency band can be used to configure the transmitter 403 and the receiver 402 of a remote antenna unit 104 having a calibration sub-system 110 to frequencies not being used by neighboring devices. A master unit 102 can provide the information about the transmit frequency band to the remote antenna unit 104 for use by the calibration sub-system 110.

In some aspects, the calibration sub-system 110 of a remote antenna unit 104 can perform a process for determining an adequate noise floor for the calibration process. The process for determining the noise floor can determine if a test signal generates an output signal having a noise floor that allows the calibration process to accurately determine the optimal values I or Q component parameters. The process for determining the noise floor can iteratively provide a test signal to an uplink path and determine the resulting noise floor for an output signal. The calibration sub-system 110 can adjust the test frequency of the test signal by increments, such as 20 MHz, in response to determining that the noise floor exceeds −40 dBm. The calibration sub-system 110 can iteratively adjust the test frequency of the test signal to obtain an acceptable noise floor for an output signal, such as −40 dBm.

Figure 16:
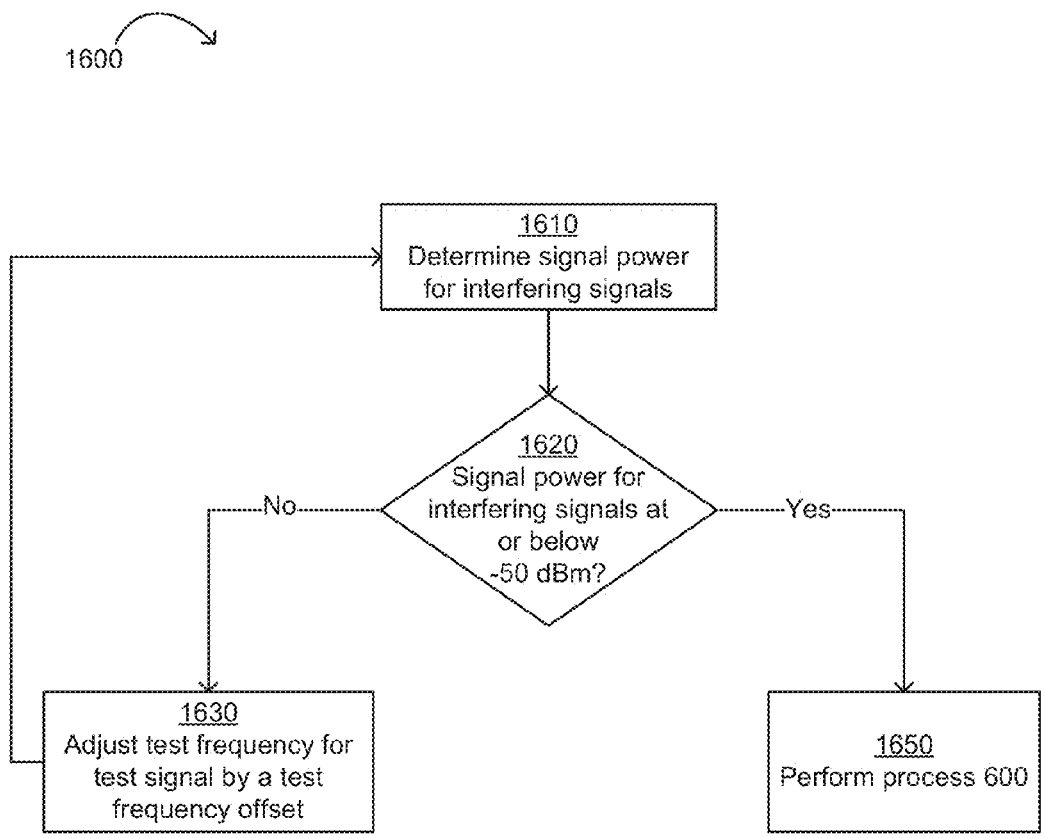
FIG. 16 is a flow chart of a process for pre-processing a calibration sub-system of a remote antenna unit to mitigate interference from interfering signals according to one aspect.

FIG. 16 is a flow chart of a process 1600 for pre-processing a calibration sub-system 110 of a remote antenna unit 104 to mitigate interference from interfering signals.

At block 1610, the signal power of interfering signals is determined. In some aspects, a remote antenna unit 104 having a calibration sub-system 110 can determine the signal power. In other aspects, the remote antenna unit 104 can receive data about the signal power of interfering signals from a master unit 102 in communication with the remote antenna unit 104 having a calibration sub-system 110.

At block 1620, a remote antenna unit 104 having a calibration sub-system 110 can determine whether the signal power for interfering signals is equal to or less than −40 dBm.

If the signal power for interfering signals is not equal to or less than −40 dBm, the calibration sub-system 110 can adjust the test frequency for a test signal by a test frequency offset. The processor 416 of the calibration sub-system 110 can configure the test signal generator 417 of the calibration sub-system 110 to adjust the test frequency for the test signal. The process 1600 can return to block 1610.

If the signal power for interfering signals is equal to or less than −40 dBm, the calibration sub-system 110 can perform at block 1630 the calibration process 600 depicted in FIG. 6.

Determination of Curve-Fitting Functions

In some aspects, determining a function of the function relating output power values or differential phase values to their respective I and Q parameter values can be performed using a one-dimensional solution. Observation on the local oscillator leakage power versus I offset and Q offset suggests that the two variables are independent to each other and having symmetry property and one global minimum. In such a case, the two variables can be treated separately and iteratively to find the optimal I offset and Q offset. Similar approach can be used to find I gain, Q gain and quadrature-mixing phase difference respectively and iteratively to reach the optimal solution in a three-dimensional space.

In case of local oscillator leakage, it is natural to use $(n-1)^{st}$ order polynomial to approximate the one-dimensional function $y=f(x)$ where y is the local oscillator leakage power and x is I offset or Q offset. To determine the n coefficients of function $$y=f(x)=a_{n-1}x^{n-1}+a_{n-2}x^{n-2}+\ldots+a_1x_1+a_0$$

m number of (x, y) samples may be collected from the sample space so that m linear equations are set up to solve for the n coefficients $(a_{n-1}, a_{n-2}, \ldots, a_1, a_0)$ $$\begin{cases} y_1 = a_{n-1}x_1^{n-1} + a_{n-2}x_1^{n-2} + \ldots + a_1x_1 + a_0 \\ y_2 = a_{n-1}x_2^{n-1} + a_{n-2}x_2^{n-2} + \ldots + a_1x_2 + a_0 \\ \vdots \\ y_m = a_{n-1}x_m^{n-1} + a_{n-2}x_m^{n-2} + \ldots + a_1x_m + a_0 \end{cases}$$

By representing $y=[y_1, y_2, y_3 \ldots y_m]^T$ and $a=[a_0, a_1, a_2 \ldots a_{n-1}]^T$ as column vectors and the variable $x_m$ as a matrix $$X = \begin{bmatrix} 1 & x_1 & \ldots & x_1^{n-2} & x_1^{n-1} \\ 1 & x_2 & \ldots & x_2^{n-2} & x_2^{n-1} \\ \vdots & \vdots & \ddots & \vdots & \vdots \\ 1 & x_m & \ldots & x_m^{n-2} & x_m^{n-1} \end{bmatrix}$$

The set of m linear equations can be represented by the equation $$Xa=y$$

For n being equal to m, the solution to the n coefficients of the Taylor series or polynomial can be represented by the equation $$a=X^{-1}y$$

For n being less than m, the solution to the n coefficients of the Taylor series or polynomial can be represented by the equation $$a=(X^TX)^{-1}X^Ty$$

For n being greater than m, the solution to the n coefficients of the Taylor series or polynomial can be represented by the equation $$a=X^T(XX^T)^{-1}y$$

Upon obtaining the Taylor series or polynomial coefficients, numerical methods of simple one dimension search and gradient method can be used to find the local and global minimum of the local oscillator leakage power, thereby determining the I or Q offset.

In some aspects, determining a function of the function relating output power values or differential phase values to their respective I and Q parameter values can be performed using a multi-dimensional solution. Multi-dimension optimization can involve using a multi-dimensional $n^{th}$ order polynomial optimization, represented by the function $$x_{opt} = \min_{X \in R^d} f(x)$$

where $X=[x_1, x_2, x_3, \ldots, x_d]$ is a d-dimensional vector and takes values from real adjustable space of each dimension.

A d-dimensional function can be optimized to find $X_{opt}$. Such a function can be:

$$f(X)=f(x_1, x_2, x_3, \ldots, x_d)=\Sigma a_{i_1 i_2 i_3 \ldots i_d}\Pi_{j=1}^d x_j^{i_j}$$

The order of function f(X) is n and satisfies $n=\Sigma_{j=1}^d i_j$ and $0 \le i_j \le n$, for $j=1, 2, 3, \ldots, d$.

A solution to this problem is described below. The coefficients $a_{i_1 i_2 i_3} \ldots i_d$ can be calculated for a given order of n. A linear least squares solution can be used to fit the multi-dimensional surface if enough and independent samples can be collected from the observation space. Numerical methods (e.g., a simplex method, a conjugate gradient method, or a linear programming method) may be used to find a global minimum and an optimal solution for $x_{opt}$.

A local oscillator leakage power can be a function of the offsets for the I and Q components. For a second order approximation (n=2) to the function, the following function can be obtained:

$$f(X)=f(x_1, x_2)=\Sigma a_{i_1 i_2}(x_1^{i_1}x_2^{i_2})$$

Six possible pairs $(i_1, i_2)$ for the I offset and Q offset can be determined from the function, as depicted in the following chart:

| $i_1$ | 0 | 0 | 1 | 1 | 0 | 2 |
|---|---|---|---|---|---|---|
| $i_2$ | 0 | 1 | 0 | 1 | 2 | 0 |

At least six (I offset and Q offset) pairs can be sampled to determine six coefficients. The optimal values for the I component offset and the Q component offset can be calculated with either one of the numerical methods mentioned above.

The sideband image power due to narrowband signal at a particular frequency can be approximated as a second order function of variables corresponding to the I component gain, the Q component gain, and the quadrature-mixing phase difference. Such a second order function can be:

$$f(X)=f(x_1, x_2, x_3)=\Sigma a_{i_1 i_2 i_3}(x_1^{i_1} x_2^{i_2} x_3^{i_3})$$

Ten possible sets ($i_1$, $i_2$, $i_3$) for the I gain, Q gain, quadrature-mixing phase ranges can be obtained, as depicted in the chart below.

| $i_1$ | 0 | 0 | 0 | 0 | 1 | 1 | 1 | 2 | 0 | 0 |
|---|---|---|---|---|---|---|---|---|---|---|
| $i_2$ | 0 | 0 | 1 | 1 | 0 | 0 | 1 | 0 | 2 | 0 |
| $i_3$ | 0 | 1 | 0 | 1 | 0 | 1 | 0 | 0 | 0 | 2 |

At least ten samples can be obtained from the allowable sample space. The optimal (minimum) sideband image power and corresponding optimal coordinates (optimal I gain, optimal Q gain, and optimal quadrature-mixing phase difference) can be calculated numerically using one of the above mentioned methods. Higher order approximations are possible using more samples and increased computation both in coefficients determination and numerical search of the minimum.

Example Implementation in MATLAB

Appendix 1 provides an example of a Matlab program demonstrating generation of a test input signal. The test signal can include a single tone of 20 MHz. This test signal can be a stimulus signal for a transmitter to generate local oscillator leakage signal components and/or sideband image signal components such that a receiver tuned to or otherwise configured to receive a frequency used by the transmitter can detect the output power of local oscillator leakage signal components and/or sideband image signal components. An optimization algorithm can be applied to cancel the local oscillator leakage signal components and/or sideband image signal components. The amplitude of 1600 can be used to generate a local oscillator leakage signal component and/or the sideband image signal component having sufficient power to be detected by a receiver and to avoid clipping by the transmitter.

Appendix 1 also provides an example of a Matlab program demonstrating operation of a calibration sub-system reducing or eliminating power of a local oscillator leakage signal and sideband image power. The sample Matlab program included in Appendix 1 can use a single tone signal at the transmitter. The detection of a local oscillator leakage signal can involve using a bandpass filter, included in the sample Matlab program as "Bp=fir1(200,[0.409 0.411],'bandpass')," to filter the received signal. The received signal can be 128,000 samples in length at a 200 MHz sampling rate. The average sum of I/Q squares can be calculated as the leakage power of the local oscillator leakage signal. The filter can be configured to be off the center of the bandwidth to avoid interference of spurs at the center of a SAW filter. The uplink frequency of the local oscillator frequency can be tuned to a target frequency plus 1 MHz. Doing so can improve calibration for frequencies, such as 700 MHz and 1400 MHz, where harmonics are present.

To calculate the sideband image power, a bandpass filter, included in the sample Matlab program as "Sb=fir1(100,[0.29 0.31],'bandpass')," can be used to filter a sideband image that is located at a 20 MHz offset to the center of the baseband. A baseband can have a bandwidth of 100 MHz. The average signal power computed as the sum of I/Q squares divided by the number of I/Q samples can be obtained for an iteration. Three iterations can be completed. The three iterations can be used to form a set of three linear equations, for example, if a quadratic curve is to be fitted. The three linear equations can be used to calculate an optimal I gain value or the optimal quadrature-mixing phase delay value to reduce or eliminate sideband image power.

Figure 17:
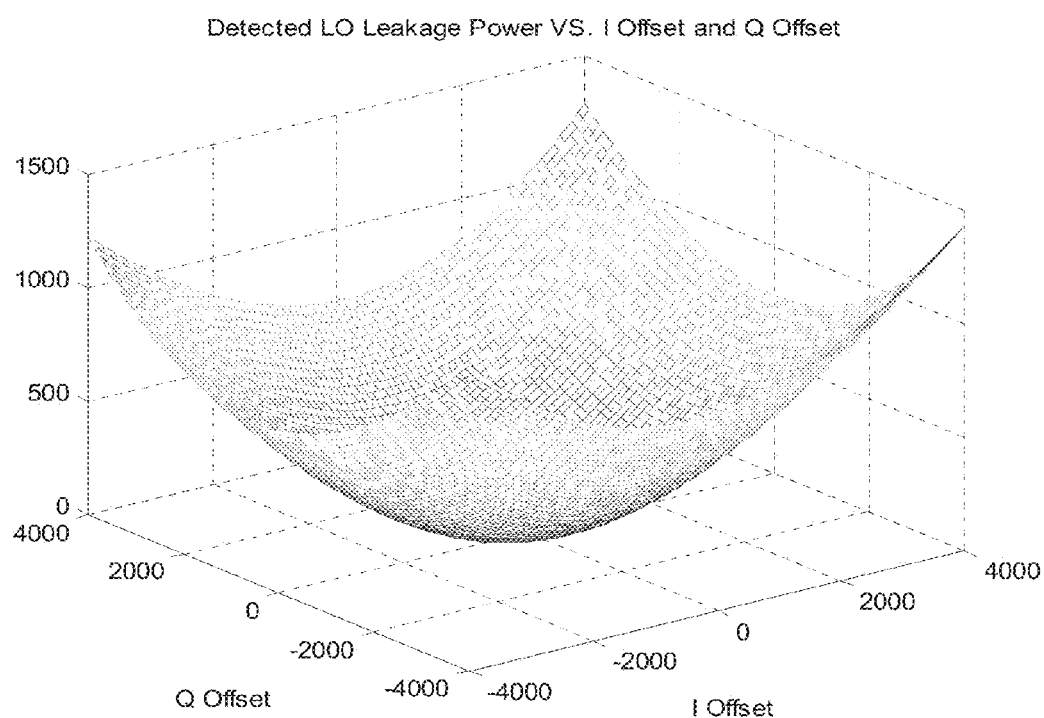
FIG. 17 is a graph depicting the signal power of a local oscillator leakage signal as a function of an offset for an I component and an offset for a Q component according to one aspect.
Figure 18:
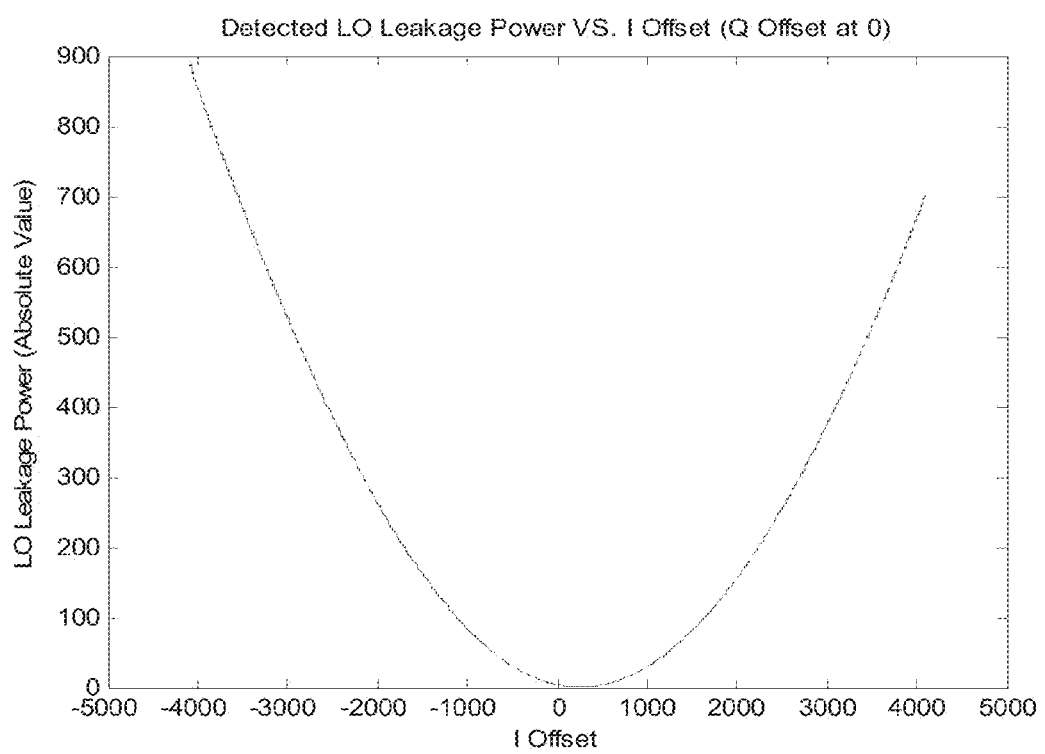
FIG. 18 is a graph depicting the signal power of a local oscillator leakage signal as a function of an offset for an I component with a fixed value for an offset of a Q component according to one aspect.

FIGS. 17-18 are graphs depicting results of the sample Matlab programs of Appendix 1.

A sample Matlab program can be used to scan the entire range in which a DAC module can adjust an I offset (−4000, 4000) and a Q offset (−4000, 4000). FIG. 17 depicts an approximate quadratic surface representing the power of a local oscillator leakage signal as a function of an adjustable offset for an I component and an adjustable offset for a Q component of a complex test signal. FIG. 18 depicts an approximate quadratic curve representing the power of a local oscillator leakage signal as a function of an offset for an I component and a fixed value for an offset of a Q component. FIG. 18 depicts the offset of a Q component having a fixed value of zero.

FIG. 19 is a chart depicting example values for local oscillator leakage power and sideband image power for a telecommunication system calibrated using the calibration sub-system according to one aspect. The reduction of a sideband image signal at 380 MHz and 400 MHz can be negatively affected due to spurious emissions at these frequencies. At other frequencies, a calibration sub-system can reduce the power of a local oscillator leakage signal and a sideband image signal by 55 dBc.

The foregoing description of aspects and features of the invention, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example. The illustrative examples described above are given to introduce the reader to the general subject matter discussed here and are not intended to limit the scope of the disclosed concepts.

What is claimed is:

1. A calibration sub-system for calibrating a unit of a distributed antenna system comprising:
  a signal generator configured to provide a plurality of test signals to a communication path of the unit, wherein each of the plurality of test signals is generated based on a respective one of a plurality of modification schemes for at least one of an in-phase signal component and a quadrature signal component;
  a receiver disposed in the communication path of the unit, the receiver configured to receive a plurality of output signals generated using the plurality of test signals; and
  a processor communicatively coupled to the signal generator and the receiver, wherein the processor is configured to:
    for each modification scheme of the plurality of modification schemes, determine a respective output power value for at least one undesirable signal component of a respective output signal received by the receiver, wherein the respective output power value is a function of the modification scheme for the in-phase signal component or the quadrature signal component of a respective test signal, the function being at least one of a Taylor series function or a polynomial function, and determine an optimal modification scheme for at least one of the in-phase signal component and the quadrature signal component such that an output power of the at least one undesirable signal component is minimized, wherein applying the function having the optimal modification scheme as an input minimizes an output value of the function.

2. The calibration sub-system of claim 1, wherein the plurality of modification schemes comprises a plurality of first values for an offset of the in-phase signal component and a plurality of second values for an offset of the quadrature signal component.

3. The calibration sub-system of claim 2, wherein the processor is configured to determine the optimal modification scheme for the in-phase signal component or the quadrature signal component by minimizing the output value of the function such that a local oscillator leakage power is minimized.

4. The calibration sub-system of claim 1, wherein the plurality of modification schemes comprises a plurality of first values for a gain of the in-phase signal component and a plurality of second values for a gain of the quadrature signal component.

5. The calibration sub-system of claim 4, wherein the plurality of modification schemes further comprises a quadrature-mixing phase difference between the in-phase signal component and the quadrature signal component.

6. The calibration sub-system of claim 5, wherein the processor is configured to determine the optimal modification scheme for the in-phase signal component or the quadrature signal component by minimizing the output value of the function such that a sideband image power is minimized.

7. The calibration sub-system of claim 1, wherein the processor is further configured to determine the optimal modification scheme by:
selecting a first testing modification scheme;
determining a first optimal modification scheme for at least one of the in-phase signal component and the quadrature signal component based on the first testing modification scheme, wherein applying the function using the first optimal modification scheme provides a first minimum output value of the function;
selecting a second testing modification scheme based on the first optimal modification scheme;
determining a second optimal modification scheme from the second testing modification scheme.

8. The calibration sub-system of claim 1, wherein the unit further comprises a digital-to-analog conversion device communicatively coupled to the processor, wherein the processor is further configured to:
generate control signals directing the digital-to-analog conversion device to implement the optimal modification scheme; and
provide the control signals to the digital-to-analog conversion device.

9. The calibration sub-system of claim 1,
wherein the signal generator is further configured to modulate the plurality of test signals with identifier data,
wherein the processor is configured to distinguish the plurality of output signals from interfering signals based on the identifier data.

10. The calibration sub-system of claim 1,
wherein the signal generator is further configured to generate each of the plurality of test signals with a frequency wobble, wherein the frequency wobble comprises a temporary change in a respective frequency of each of the plurality of test signals;
wherein the receiver is synchronized with the frequency wobble;
wherein the processor is configured to distinguish the plurality of output signals from interfering signals based on the frequency wobble.

11. A method for calibrating a unit of a distributed antenna system comprising:
selecting at least one of an in-phase signal component and a quadrature signal component affecting an output power of an undesirable output signal component;
selecting a plurality of modification schemes for the in-phase signal component or the quadrature signal component;
providing a plurality of test signals respectively generated based on the plurality of modification schemes to a communication path of the unit;
for each of a plurality of output signals generated using the plurality of test signals, determining a respective output power, wherein the respective output power value is a function of the respective modification scheme for the in-phase signal component or the quadrature signal component of the respective test signal used to generate the output signal, the function being at least one of a Taylor series function or a polynomial function; and
determining an optimal modification scheme for the in-phase signal component or the quadrature signal component such that the output power of at least one undesirable signal component is minimized, wherein applying the function having the optimal modification scheme as an input minimizes an output value of the function.

12. The method of claim 11, wherein the plurality of modification schemes comprises a plurality of first values for an offset of the in-phase signal component and a plurality of second values for an offset of the quadrature signal component.

13. The method of claim 12, wherein determining the optimal modification scheme for the in-phase signal component or the quadrature signal component comprises minimizing the output value of the function such that a local oscillator leakage power is minimized.

14. The method of claim 11, wherein the plurality of modification schemes comprises a plurality of first values for a gain of the in-phase signal component and a plurality of second values for a gain of the quadrature signal component.

15. The method of claim 14, wherein the plurality of modification schemes further comprises a quadrature-mixing phase difference between the in-phase signal component and the quadrature signal component.

16. The method of claim 15, wherein determining the optimal modification scheme for the in-phase signal component or the quadrature signal component comprises minimizing the output value of the function such that a sideband image power is minimized.

17. The method of claim 11, wherein determining the optimal modification scheme comprises:
selecting a first testing modification scheme;
determining a first optimal modification scheme for at least one of the in-phase signal component and the quadrature signal component based on the first testing modification scheme, wherein applying the function using the first optimal modification scheme provides a first minimum output value of the function;
selecting a second testing modification scheme based on the first optimal modification scheme;
determining a second optimal modification scheme from the second testing modification scheme.

18. The method of claim 11, further comprising configuring a digital-to-analog conversion device of the unit to implement the optimal modification scheme.

19. The method of claim 11, further comprising:
modulating the plurality of test signals with identifier data,
distinguishing the plurality of output signals from interfering signals based on the identifier data.

20. The method of claim 11, further comprising:
generating each of the plurality of test signals with a frequency wobble, wherein the frequency wobble comprises a temporary change in a respective frequency of each of the plurality of test signals;
distinguishing the plurality of output signals from interfering signals based on the frequency wobble.

* * * * *